United States Patent
Madsen et al.

(10) Patent No.: US 10,866,109 B2
(45) Date of Patent: Dec. 15, 2020

(54) THREE-DIMENSIONAL TERRAIN MAPPING

(71) Applicant: AGJUNCTION LLC, Hiawatha, KS (US)

(72) Inventors: Tommy Ertbolle Madsen, Fremont, CA (US); Tri M. Dang, Durack (AU); Joshua M. Gattis, Robinson, KS (US); Andreas F. Ramm, Woolloongabba (AU); Eran D. B. Medagoda, Morningside (AU); Steven J. Dumble, Brisbane (AU); Bilal Arain, Hiawatha, KS (US)

(73) Assignee: AgJunction LLC, Scottsdale, AZ (US)

( * ) Notice: Subject to any disclaimer, the term of this patent is extended or adjusted under 35 U.S.C. 154(b) by 67 days.

(21) Appl. No.: 16/177,381

(22) Filed: Oct. 31, 2018

(65) Prior Publication Data
US 2019/0128690 A1    May 2, 2019

Related U.S. Application Data

(60) Provisional application No. 62/579,515, filed on Oct. 31, 2017.

(51) Int. Cl.
  *G01C 21/36*     (2006.01)
  *G06T 17/05*     (2011.01)
  (Continued)

(52) U.S. Cl.
  CPC ........ *G01C 21/3602* (2013.01); *A01B 63/023* (2013.01); *A01B 69/008* (2013.01); *A01B 79/005* (2013.01); *B60C 23/002* (2013.01); *B60K 35/00* (2013.01); *B60W 10/20* (2013.01); *B60W 10/30* (2013.01); *B60W 30/00* (2013.01); *B62D 6/001* (2013.01); *B62D 15/0265* (2013.01); *E02F 9/2045* (2013.01); *G01C 11/02* (2013.01); *G01C 21/20* (2013.01); *G01C 21/30* (2013.01); *G05D 1/027* (2013.01); *G05D 1/0212* (2013.01); *G05D 1/0214* (2013.01); *G05D 1/0217* (2013.01); *G05D 1/0246* (2013.01); *G05D 1/0274* (2013.01); *G06F 16/29* (2019.01); *G06T 17/05* (2013.01); *B60W 2300/152* (2013.01); *B60W 2520/26* (2013.01); *B60W 2530/10* (2013.01); *B60W 2552/00* (2020.02); (Continued)

(58) Field of Classification Search
  CPC .................................................. G01C 21/3602
  USPC ......................................................... 701/448
  See application file for complete search history.

(56) References Cited

U.S. PATENT DOCUMENTS

| 4,495,500 A | 1/1985 | Vickers |
| 5,194,851 A | 3/1993 | Kraning et al. |

(Continued)

FOREIGN PATENT DOCUMENTS

WO    WO2019089853    5/2019

OTHER PUBLICATIONS

International Search Report and Written Opinion; PCT/US2018/058586; dated Feb. 27, 2019.

(Continued)

*Primary Examiner* — Jason C Olson
(74) *Attorney, Agent, or Firm* — Schwabe Williamson & Wyatt

(57) ABSTRACT

Embodiments of the present disclosure relate generally to generating and utilizing three-dimensional terrain maps for vehicular control. Other embodiments may be described and/or claimed.

20 Claims, 10 Drawing Sheets

(51) Int. Cl.

| | | |
|---|---|---|
| *G05D 1/02* | (2020.01) | |
| *G01C 11/02* | (2006.01) | |
| *G01C 21/30* | (2006.01) | |
| *E02F 9/20* | (2006.01) | |
| *A01B 69/04* | (2006.01) | |
| *A01B 79/00* | (2006.01) | |
| *B60K 35/00* | (2006.01) | |
| *B60C 23/00* | (2006.01) | |
| *B60W 10/20* | (2006.01) | |
| *B60W 10/30* | (2006.01) | |
| *B60W 30/00* | (2006.01) | |
| *B62D 6/00* | (2006.01) | |
| *B62D 15/02* | (2006.01) | |
| *G01C 21/20* | (2006.01) | |
| *G06F 16/29* | (2019.01) | |
| *A01B 63/02* | (2006.01) | |

(52) U.S. Cl.
CPC ..... *B60W 2710/20* (2013.01); *B60W 2710/30* (2013.01); *G05D 1/0278* (2013.01); *G05D 2201/0201* (2013.01)

(56) References Cited

U.S. PATENT DOCUMENTS

| | | | |
|---|---|---|---|
| 5,390,125 A | 2/1995 | Sennott et al. | |
| 5,663,879 A | 9/1997 | Trovato et al. | |
| 5,923,270 A | 7/1999 | Sampo et al. | |
| 6,052,647 A | 4/2000 | Parkinson et al. | |
| 6,070,673 A | 6/2000 | Wendte | |
| 6,212,453 B1 | 4/2001 | Kawagoe et al. | |
| 6,373,432 B1 | 4/2002 | Rabinowitz et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,711,501 B2 | 3/2004 | McClure et al. | |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,162,348 B2 | 1/2007 | McClure et al. | |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| 7,689,354 B2 | 3/2010 | Heiniger et al. | |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,018,376 B2 | 9/2011 | McClure et al. | |
| 8,190,337 B2 | 5/2012 | McClure | |
| 8,214,111 B2 | 7/2012 | Heiniger et al. | |
| 8,311,696 B2 | 11/2012 | Reeve | |
| 8,386,129 B2 | 2/2013 | Collins et al. | |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,548,649 B2 | 10/2013 | Guyette et al. | |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,594,879 B2 | 11/2013 | Roberge et al. | |
| 8,634,993 B2 | 1/2014 | McClure | |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,117,185 B2* | 8/2015 | Vian | G06Q 50/02 |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,255,992 B2 | 2/2016 | McClure | |
| 9,389,615 B2 | 7/2016 | Webber et al. | |
| 1,025,132 A1 | 4/2019 | Foster | |
| 1,025,567 A1 | 4/2019 | Wu | |
| 2002/0072850 A1 | 6/2002 | McClure et al. | |
| 2004/0186644 A1 | 9/2004 | McClure et al. | |
| 2005/0171684 A1 | 8/2005 | Turner | |
| 2005/0288834 A1 | 12/2005 | Heiniger et al. | |
| 2006/0167600 A1 | 7/2006 | Nelson, Jr. et al. | |
| 2008/0162004 A1 | 7/2008 | Price | |
| 2010/0274452 A1 | 10/2010 | Ringwald et al. | |
| 2011/0060478 A1* | 3/2011 | Nickolaou | G01S 17/86 701/1 |
| 2011/0238457 A1 | 9/2011 | Mason | |
| 2012/0114185 A1* | 5/2012 | Ram | G06Q 10/087 382/110 |
| 2012/0139755 A1* | 6/2012 | Ginsberg | G08G 1/096791 340/905 |
| 2012/0253664 A1 | 10/2012 | Sandoval et al. | |
| 2012/0300986 A1* | 11/2012 | Stege | F03D 17/00 382/104 |
| 2013/0046439 A1* | 2/2013 | Anderson | B60C 23/002 701/36 |
| 2013/0103249 A1 | 4/2013 | Pieper et al. | |
| 2014/0266877 A1 | 9/2014 | McClure | |
| 2014/0277676 A1 | 9/2014 | Gattis | |
| 2015/0175194 A1 | 6/2015 | Gattis | |
| 2015/0305238 A1* | 10/2015 | Klausmann | A01D 41/127 701/50 |
| 2016/0039454 A1 | 2/2016 | Mortimer | |
| 2016/0057920 A1* | 3/2016 | Spiller | A01B 69/008 701/23 |
| 2016/0147225 A1 | 5/2016 | Sights | |
| 2016/0154108 A1 | 6/2016 | McClure et al. | |
| 2016/0205864 A1 | 7/2016 | Gattis et al. | |
| 2016/0214643 A1 | 7/2016 | Joughin et al. | |
| 2016/0252909 A1 | 9/2016 | Webber et al. | |
| 2016/0334798 A1* | 11/2016 | Foster | G05D 1/0274 |
| 2016/0334804 A1 | 11/2016 | Webber et al. | |
| 2017/0015416 A1* | 1/2017 | O'Connor | A01C 23/047 |
| 2017/0127606 A1* | 5/2017 | Horton | G06T 17/05 |
| 2017/0248969 A1* | 8/2017 | Ham | G01C 5/005 |
| 2017/0261986 A1 | 9/2017 | Gerrish | |
| 2017/0293810 A1 | 10/2017 | Allen | |
| 2019/0113936 A1* | 4/2019 | Anderson | G08G 5/003 |
| 2019/0114847 A1* | 4/2019 | Wagner | G05D 1/0016 |
| 2019/0124819 A1 | 5/2019 | Madsen | |
| 2019/0129430 A1 | 5/2019 | Madsen | |
| 2019/0129435 A1 | 5/2019 | Madsen | |

OTHER PUBLICATIONS

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

European Patent Office; International Preliminary Report on Patentability; PCT/US2018/058586; dated May 14, 2020; pp. 1-11.

* cited by examiner

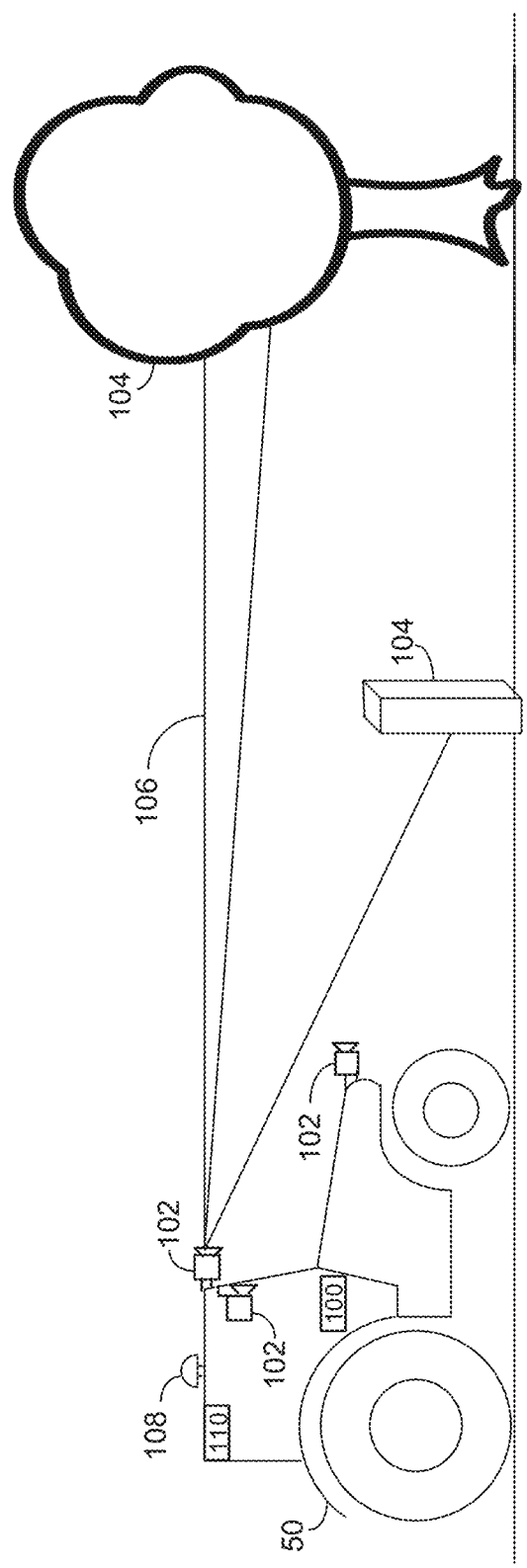

THREE-DIMENSIONAL TERRAIN MAPPING

RELATED APPLICATION

The present application claims priority to U.S. Provisional Patent Application Ser. No. 62/579,515 filed on Oct. 31, 2017, entitled: TERRAIN MAPPING, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate generally to generating and utilizing three-dimensional terrain maps for vehicular control. Other embodiments may be described and/or claimed.

BACKGROUND

Vehicle control systems may be used to automatically or semi-automatically move a vehicle along a desired path. Three-dimensional terrain maps are maps that depict the topography of an area of terrain, including natural features (such as rivers, mountains, hills, ravines, etc.) and other objects associated with the terrain (such as vehicles, fences, power transmission lines, etc.). Among other things, embodiments of the present disclosure describe the generation and use of three-dimensional terrain maps in conjunction with vehicle control systems.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 1A is a block diagram of an example of a vehicle control system according to various aspects of the present disclosure.

DETAILED DESCRIPTION

I. System Examples

Figure 1B:
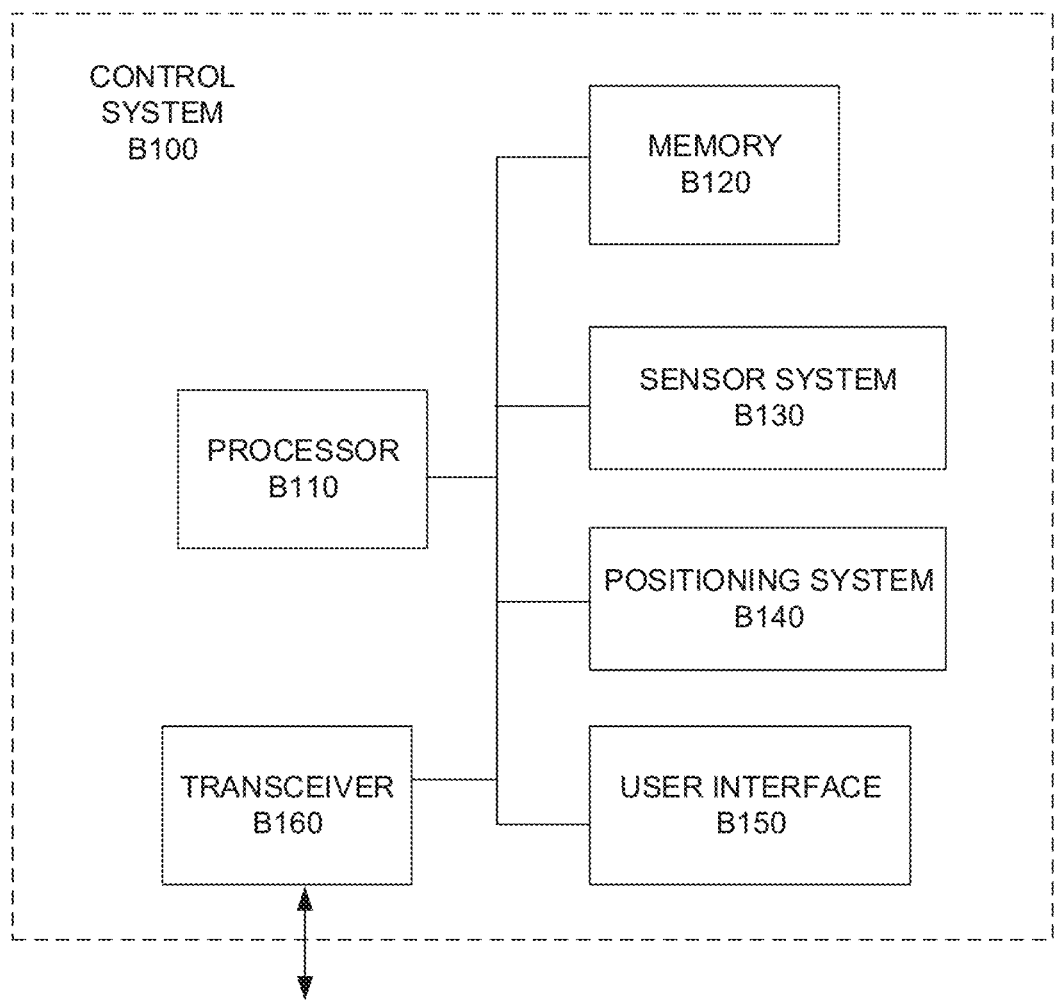
FIG. 1B is a block diagram illustrating an example of components of a control system according to various aspects of the present disclosure.

FIG. 1A is a block diagram of a vehicle 50 that includes a vehicle control system 100 for controlling various functions of vehicle 50, including the steering of the vehicle. Vehicle control system may also be used in conjunction with generating a 3D terrain map as described below (for example with reference to the method described in FIG. 3). In the example shown in FIG. 1A, control system 100 includes a camera system that uses one or more sensors, such as cameras 102, to identify features 104 in a field of view 106. In alternate embodiments sensors may be positioned in any desired configuration around vehicle 50. For example, in addition facing forward, the cameras 102 may also be positioned at the sides or back of vehicle 50. Sensors may also be configured to provide a 360-degree coverage around the vehicle, such as an omnidirectional camera that takes a 360 degree view image.

In the example shown in FIG. 1A, the vehicle control system 100 operates in conjunction with a global navigation satellite system (GNSS) 108 and an inertial measurement unit (IMU) 110. Data from the GNSS may be used, for example, in conjunction with turn rates and accelerations from IMU 110 for determining a heading and position of vehicle 50 that are then used for steering vehicle 50.

Control system 100 may also use data from sensors (including optical sensors, such as cameras 102) to create a map of an area using a simultaneous localization and mapping (SLAM) process. Terrain features 104 may be represented in the 3D map The map may be geographically located (also known as "geo-location") with data from the GNSS 108. In some embodiments, the 3D map may be stored online for access and updating by the multiple vehicles working in an area (e.g., agricultural vehicles working within the same field).

FIG. 1B illustrates an example of the components of a control system B100. In some embodiments, the components of control system B100 may be used to implement a vehicle control system (such as the systems depicted in FIG. 1A and FIG. 2), a terrain mapping system (e.g., for generating a 3D terrain map), or a vehicle implement control system as referenced in more detail below. Similarly, control system B100 may be used to implement, or in conjunction with, the methods described in FIGS. 3-6.

In this example, control system B100 includes a processor B110 in communication with a memory B120, sensor system B130, positioning system B140, user interface B150, and a transceiver B160. System B100 may include any number of different processors, memory components, sensors, user interface components, and transceiver components, and may interact with any other desired systems and devices in conjunction with embodiments of the present disclosure. Alternate embodiments of control system B100 may have more, or fewer, components than shown in the example depicted in FIG. 1B.

The functionality of the control system B100, including the steps of the methods described below (in whole or in part), may be implemented through the processor B110 executing computer-readable instructions stored in the memory B120 of the system B100. The memory B120 may store any computer-readable instructions and data, including software applications and embedded operating code. Portions of the functionality of the methods described herein may also be performed via software operating on one or more other computing devices in communication with control system B100 (e.g., via transceiver B160).

The functionality of the system B100 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components.

Any type of processor B110, such as an integrated circuit microprocessor, microcontroller, and/or digital signal processor (DSP), can be used in conjunction with embodiments of the present disclosure. A memory B120 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory B120 in any desired manner, such as in a relational database.

The sensor system B130 may include a variety of different sensors, including sensors for analyzing terrain surrounding a vehicle, such as an imaging device (e.g., a camera or optical sensor), a radar sensor, and/or a lidar sensor. Sensor system B130 may further include sensors for determining characteristics regarding a vehicle or terrain, such as an accelerometer, a gyroscopic sensor, and/or a magnetometer.

The positioning system B140 may include a variety of different components for determining the position of a vehicle. For example, positioning system may include a global navigation satellite system (GNSS), a local positioning system (LPS), and/or an inertial navigation system (INS).

The system B100 includes a user interface B150 that may include any number of input devices (not shown) to receive commands, data, and other suitable input. The user interface B150 may also include any number of output devices (not shown) to provides the user with data (such as a visual display of a 3D terrain map and a path to be taken by a vehicle), alerts/notifications, and other information. Typical I/O devices may include display screens, mice, keyboards, printers, scanners, video cameras and other devices.

Transceiver B160 may include any number of communication devices (such as wireless or wired transceivers, modems, network interfaces, etc.) to enable the system B100 to communicate with one or more computing devices, as well as other systems. The control system B100 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

Transceiver B160 may be adapted to communicate using any electronic communications system or method. Communication among components operating in conjunction with embodiments of the present disclosure may be performed using any suitable communication method, such as, for example, a telephone network, an extranet, an intranet, the Internet, wireless communications, transponder communications, local area network (LAN), wide area network (WAN), virtual private network (VPN), networked or linked devices, and/or any suitable communication format.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A tangible, non-transitory computer-readable medium can be used to store software and data which when executed by a system, causes the system to perform various operations described herein. The executable software and data may be stored on various types of computer-readable media including, for example, ROM, volatile RAM, non-volatile memory and/or cache. Other examples of computer-readable media include, but are not limited to, recordable and non-recordable type media such as volatile and non-volatile memory devices, read only memory (ROM), random access memory (RAM), flash memory devices, disk storage media, optical storage media (e.g., Compact Disk Read-Only Memory (CD ROMS), Digital Versatile Disks (DVDs), etc.), among others.

Figure 2:
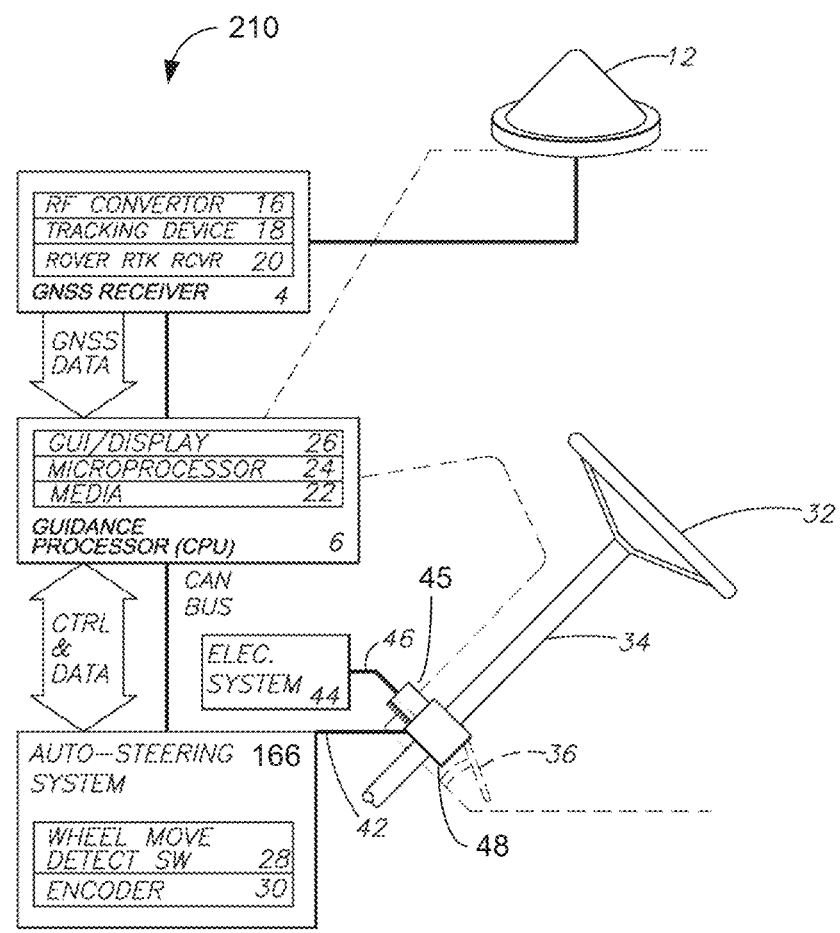
FIG. 2 illustrates an example of a vehicle control system coupled to a vehicle.

FIG. 2 shows another example of a vehicle control system 210. In this example, vehicle control system 210 includes a GNSS receiver 4 comprising an RF convertor (i.e., down-convertor) 16, a tracking device 18, and a rover RTK receiver element 20. The receiver 4 electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to a steering control system 166 (also referred to herein as an "auto-steering system") for controlling operation of the vehicle. Auto-steering system 166 includes a wheel movement detection switch 28 and an encoder 30 for interpreting guidance and steering commands from CPU 6.

Auto-steering system 166 may interface mechanically with the vehicle's steering column 34, which is mechanically attached to steering wheel 32. A control line 42 may transmit guidance data from the CPU 6 to the auto-steering system 166. An electrical subsystem 44, which powers the electrical needs of vehicle 100, may interface directly with auto-steering system 166 through a power cable 46. The auto-steering subsystem 166 can be mounted to steering column 34 near the floor of the vehicle, and in proximity to the vehicle's control pedals 36. Alternatively, auto-steering system 166 can be mounted at other locations along steering column 34.

The auto-steering system 166 physically drives and steers vehicle 100 or 110 by actively turning the steering wheel 32 via steering column 34. A motor 45 powered by vehicle electrical subsystem 44 may power a worm drive which powers a worm gear 48 affixed to auto-steering system 166. These components are preferably enclosed in an enclosure. In other embodiments, auto-steering system 166 is integrated directly into the vehicle drive control system independently of steering column 34.

II. Three-Dimensional Terrain Mapping

Embodiments of the present disclosure may be used to generate three-dimensional (3D) terrain maps (also known as three dimensional elevation models). Such maps may be generated using data from a variety of sources, such as satellite imagery, surveying using a global navigation satellite system (GNSS) such as a global positioning system (GPS), surveying using radar or lidar, using imagery and sensor data captured from ground-based-vehicles, aerial images from airplanes or drones, and other data. The different method will have different spatial and height resolution.

Figure 3:
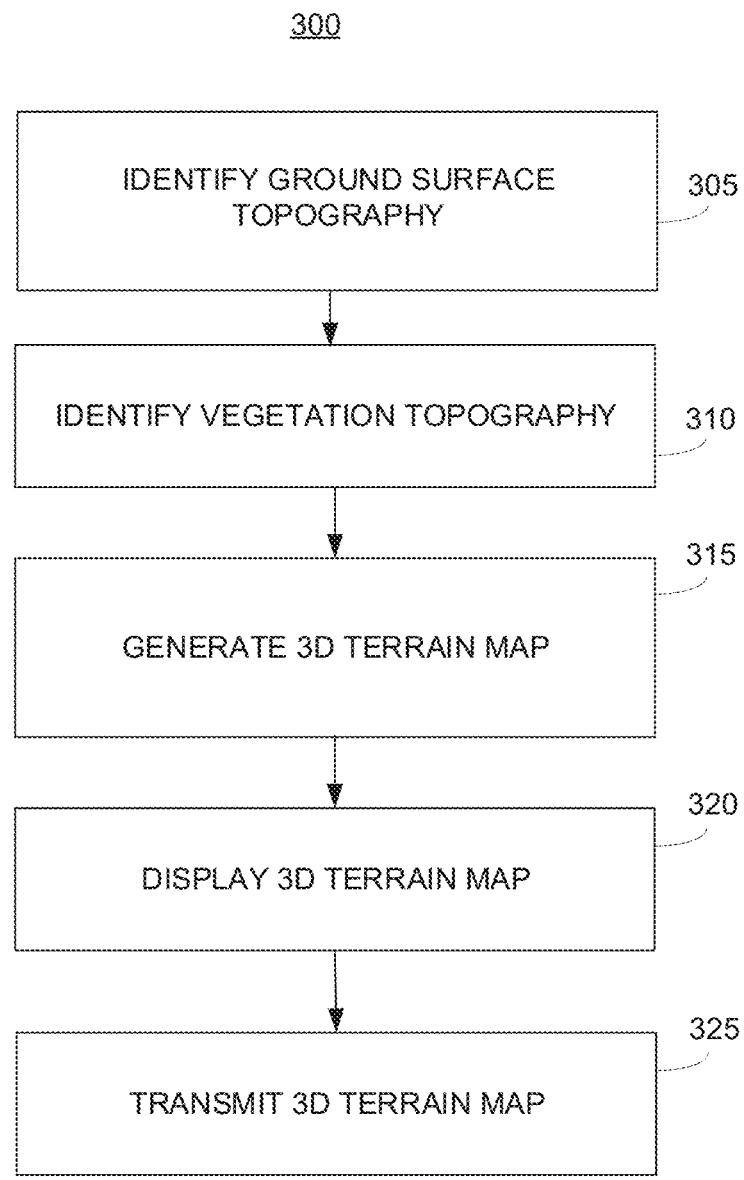
FIG. 3 is a flow diagram illustrating an example of a process according to various embodiments of the present disclosure.

FIG. 3 illustrates a method 300 for generating a 3D terrain map according to various aspects of the present disclosure. In this example, method 300 includes identifying, by a terrain mapping system (e.g., implemented by control system B100 in FIG. 1B), a ground surface topography for a section of terrain (305), identifying a topography of vegetation on the section of terrain (310), generating, a two-dimensional representation of a 3D terrain map including the ground surface topography for the section of terrain and the topography of vegetation on the section of terrain, displaying the 3D terrain map (320), and transmitting the 3D terrain map to another system or device (325).

In method 300, the system may identify a ground surface topography for a section of terrain (305) based on data received from a sensor system (e.g., sensor system B130 in FIG. 1B) and positioning system (e.g., positioning system B140 in FIG. 1B). In some embodiments, sensor system may include one or more optical sensors, such as a digital camera.

Method 300 further includes identifying (e.g., based on the data received from the sensor system and positioning system) a topography of vegetation on the section of terrain (310).

Method 300 includes generating a two-dimensional representation of a three-dimensional terrain map that includes the ground surface topography for the section of terrain and the topography of vegetation on the section of terrain. In some embodiments, the terrain mapping system implementing method 300 in FIG. 3 includes a display screen (e.g., as part of user interface B150 in FIG. 1B), and the terrain mapping system displays (320) the three-dimensional terrain map on the display screen.

The system may identify a plurality of objects within the section of terrain and provide visual indicators for each object on the 3D terrain map. Additionally, the 3D map may include a respective visual indicator on the map for each respective object representing the object is traversable by the vehicle. For example, the 3D map may include color-coded objects, with red coloring indicating impassible/non-traversable objects, green coloring indicating traversable objects, and yellow indicating that a human operator must authorize the plotting of a path over/through such an object by a vehicle.

In some embodiments, generating the three-dimensional terrain map includes identifying a height of a portion of the vehicle above the ground surface. Among other things, the system may determine a depth of tracks made by the vehicle based on a change in the height of the portion of the vehicle above the ground surface.

In some embodiments, for example, a 3D sensor system may be used to measure the terrain surface relative to the sensor mounting pose on the vehicle. In some embodiments, the sensor system may include a rotating lidar system adapted to sweep a number of laser beams around the Z axis of the sensor at a high frequency. Additionally or alternatively, the sensor system may include an array of static laser beams, a stereo camera based on two or more cameras, or another 3D imaging or scanning device.

Figure 7:
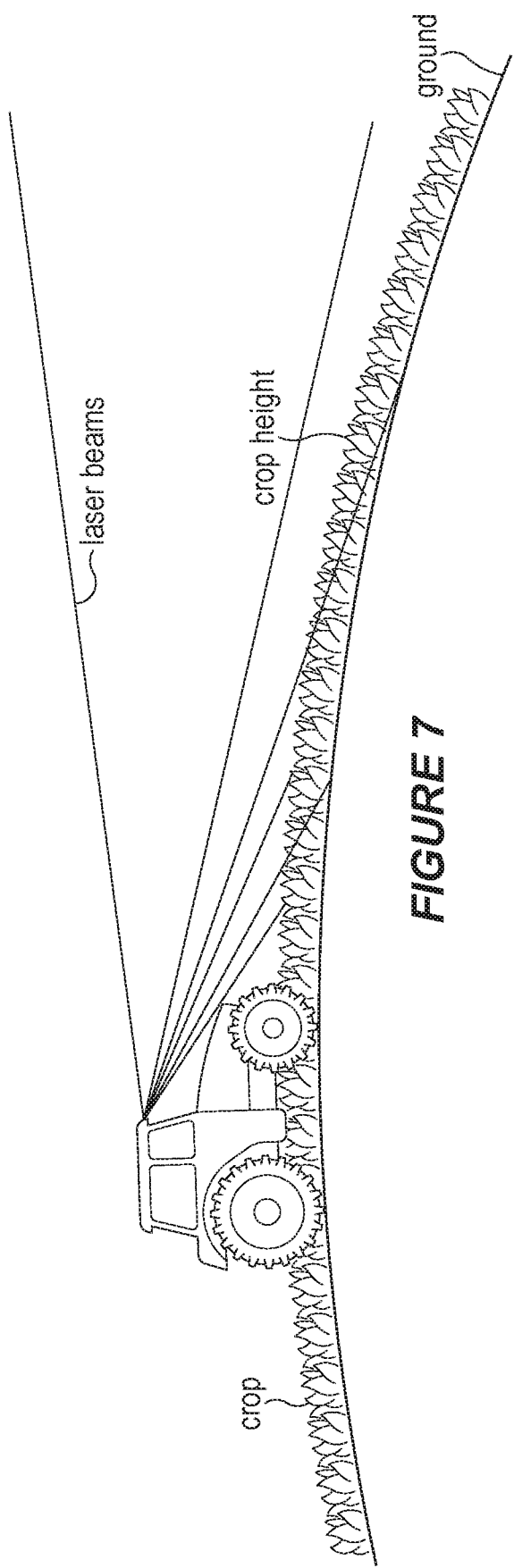
FIG. 7-11 are diagrams of vehicles illustrating various embodiments of the present disclosure.

In some embodiments, 3D sensors can provide information when there is no previous GNSS height information available/terrain model, as well as provide very detailed maps (e.g., with a resolution of about 2 cm). Embodiments of the present disclosure may use GNSS to avoid drift in measuring the height of vegetation or other terrain features. In some cases, particularly if high accuracy GNSS is not available, the system may utilize data from prior-generated elevations maps, particularly if they have better accuracy than the GNSS. FIG. 7 illustrates an example of a vehicle with 3D sensors comprising an array of laser beams for determining the height of crops planted on a section of terrain relative to the surface of the ground.

In some embodiments, the system may identify the height of vegetation above the ground surface during periods where a vehicle is driving between rows of crops such that the edge of the crops may be more visible (e.g., because of no crops in between the rows, or sparse stubbles from previous crops).

By utilizing existing 3D terrain maps together with sensor readings, the system helps to create a better estimation of the current terrain and be able to better accommodate for changes. This can help improve the steering performance, provide valuable lookahead for the height control of wide implements for the height to be adjusted smoothly and/or avoid damage. Embodiments of the present disclosure may also be used to help speed up or slow down the vehicle (e.g., via an automatic or semi-automatic vehicle control system) to increase comfort to an operator, or to traverse a stretch of rough terrain to reduce strain on vehicles and tools. In some cases the system may also plot a new path for the vehicle to avoid an area.

Figure 8:
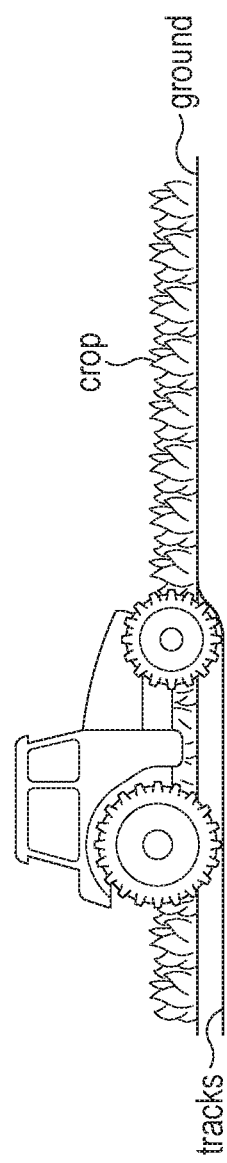

In some embodiments, the system may be used to detect that a vehicle is sinking into the ground based on parameters such as the tire pressure or load on the vehicle, and the height of the GNSS antenna above the ground plane. For example, a measurement from a 3D sensor may be used to detect the actual GNSS antenna height above the ground surface. If the vehicle is sinking into the ground, the change in the antenna height may be used to measure the depth of the tracks made by the vehicle to determine the degree to which the vehicle is sinking into the ground. FIG. 8, for example, depicts the height of crops relative to the ground, as well the depth beneath the ground level of the tracks made by the vehicle.

In some embodiments, the sensor system may include camera capturing two-dimensional (2D) images. The images may have a variety of different resolutions or other characteristics. For example, the camera may capture images in the human-visible spectrum (e.g., red-green-blue or "RGB" images) or other wavelengths of interest. In another example, images may be captured in an infrared (IR) or near-infrared (NIR) spectrum. For 3D maps of agricultural terrain, for example, embodiments of the present disclosure may use NIR images as the NIR reflectance of plants are often high and, plant health indexes such as a normalized difference vegetation index (NDVI) can be calculated based on 3D maps generated using NIR image data.

The 3D terrain map may be generated using data from a variety of different sources. For example, the system may generate the 3D map by fusing terrain point clouds with GNSS and IMU data to a detailed 3D map of the terrain in a global frame of reference.

Embodiments of the present disclosure may generate 3D terrain maps of particular use in agricultural/farming applications. For example, generation of the three-dimensional terrain map may include determining a height of a portion of the vegetation (e.g., crops) on the terrain above the ground surface to help determine whether a crop is ready for harvesting, identify brush that may need to be cleared from a field before planting, assess the health of crops, and other uses.

The system may also use data (in real-time or near-real-time) from the positioning system and/or sensor system to identify discrepancies in a pre-existing 3D terrain map, and update the 3D terrain map accordingly. For example, the system may modify a pre-existing feature of a pre-existing three-dimensional terrain map based on the ground surface topography for the section of terrain and the topography of vegetation on the section of terrain to reflect, for example, the growth or harvesting of crops on the terrain.

In some embodiments, the terrain mapping system may identify a level of moisture in a section of terrain depicted in a 3D terrain map, and provide information regarding the moisture. For example, the system may identify a first level of moisture in a first portion of the section of terrain (e.g., a relatively dry portion of a field), and identify a second level of moisture in a second portion of the section of terrain (e.g., a relatively wet portion of a field). In this manner, the system helps to identify safe (e.g., dryer) paths for vehicles planning to drive over the terrain to avoid equipment sinking or damaging the field.

Similarly, the system may identify a body of water in the section of terrain, such as a puddle, pond, lake, stream, or river, as well as determining whether a particular vehicle is capable of traversing the body of water. In determining traversability, the system may determine a rate of flow of water through the body of water, as well as a depth of the body of water. In cases where the body of water is non-traversable, the system may identify (e.g., visually on the 3D terrain map) a path for the vehicle to circumvent the body of water.

The system may indicate a variety of different features on the 3D terrain map. In addition to natural features (e.g., mountains, streams, trees, ravines, etc.) the system may indicate man-made features, such as fences, power distribution lines, roads, etc. In some embodiments, the system may indicate a path for one or more vehicles on the 3D terrain map. For example, the system may draw wheel tracks across the map (e.g., using a particular color of lines) to represent the path to be taken by a vehicle. The track lines may be spaced based on the wheel-base of the vehicle.

In some embodiments, for a map generated using GNSS data captured from a vehicle traversing a section of terrain, there may only be measurements from where the vehicle has been driving. The rest of the map may thus be determined by the system based on the measurements of the vehicle's sensor/positioning systems. Depending on how the field is farmed, such measurements may be very dense or very sparse (e.g., controlled traffic farming where there are only tracks every 12 meters).

The system may transmit (e.g., using transceiver B160 in FIG. 1B) an electronic communication comprising the three-dimensional map to another system or device, such as a vehicle control system. For example, the system may transmit the 3D terrain map to a plurality of other vehicles operating in the same area (e.g., within the same field) to allow the vehicles to coordinate their paths and operations.

Embodiments of the present disclosure may utilize updated data to help continuously improve the accuracy of 3D terrain maps. For example, the system may map the environment (e.g., based on current GNSS/INS auto steering systems) and then continuously updating the model of the terrain presented in the 3D map based on by data from sensors coupled to one or more vehicles traversing the terrain.

In some embodiments, the system may continuously log all sensor inputs and performance parameters of the system and transmit them to another system (e.g., a cloud service) that can analyze data from multiple vehicles. By getting information from multiple vehicles and training prediction models based on such data, embodiments of the disclosure can help vehicle control systems to handle more difficult scenarios without human intervention, thus providing improvements over conventional autonomous or semi-autonomous vehicle control systems.

In some cases, the 3D terrain map may be based on a variety of information from different sensors. Such information may include, for example, 3D pointcloud data, images, GNSS data, INS data, speed/velocity data for a vehicle (e.g., based on wheel revolutions), characteristics of the vehicle (e.g., tire pressure) and other information.

The 3D terrain map may also be generated based on data from other sources, such as historical data (e.g., previously-generated terrain maps), weather information, and information regarding the terrain, such as soil information, depreciation information, the expected evaporation of water based on soil type, etc. In this manner, embodiments of the present disclosure can help make better plans for executing tasks, as well as improving the ability of the system to handle unforeseen scenarios.

Embodiments of the present disclosure may also use machine learning to optimize maps using sensor input analysis algorithms and controllers to improve performance. The system may further deploy updated maps and revised algorithms to maintain the accuracy of the system.

III. Vehicle Control Optimization

Among other things, embodiments of the present disclosure may utilize 3D terrain maps to help improve the steering performance of vehicle control systems, particularly in uneven or rolling terrain. For example, 3D terrain maps may be used to help planning paths for vehicles driving on a side slope (e.g., what slope change to anticipate). In other example, the system may utilize slip predictions to improve steering (e.g., in curves).

Figure 9:
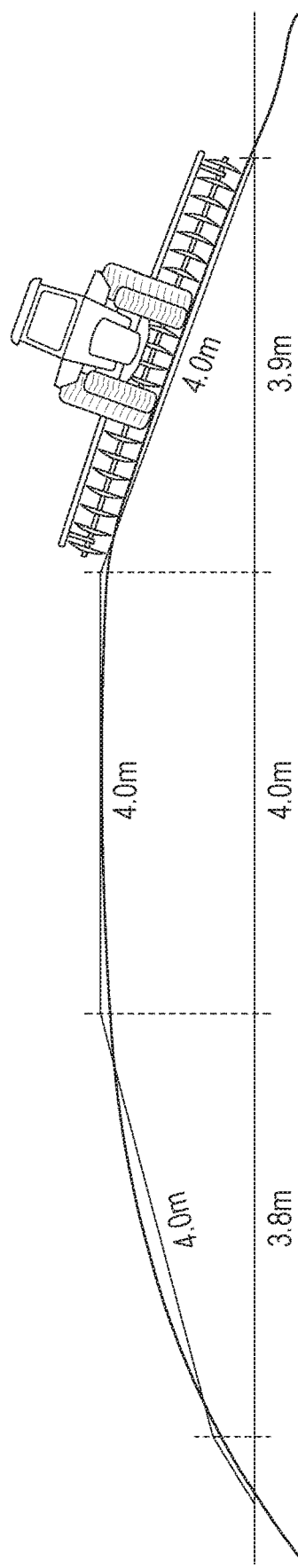

Additionally, in cases where a vehicle is coupled to a vehicle implement (e.g., a tractor towing a plow or disc) the direction of a passive implement may be determined relative to the vehicle such that a path can be planned to compensate for farming pass to pass along terrain inflection points, such as terrace tops or channel valleys. Often these areas may show large pass to pass errors unless the driver takes over to nudge the location of the vehicle. Embodiments of the present disclosure, by contrast, can provide better pass-to-pass positioning, even in rolling conditions, using information from 3D terrain maps as well as data from sensor system and positioning systems coupled to the vehicle. In FIG. 9, for example, the system may identify the dimensions of section of rolling terrain to be traversed by a vehicle in order to plan the path of the vehicle to cover the rolling section optimally (e.g., using three passes corresponding to the three segmented sections shown in FIG. 9, in this example).

Figure 4:
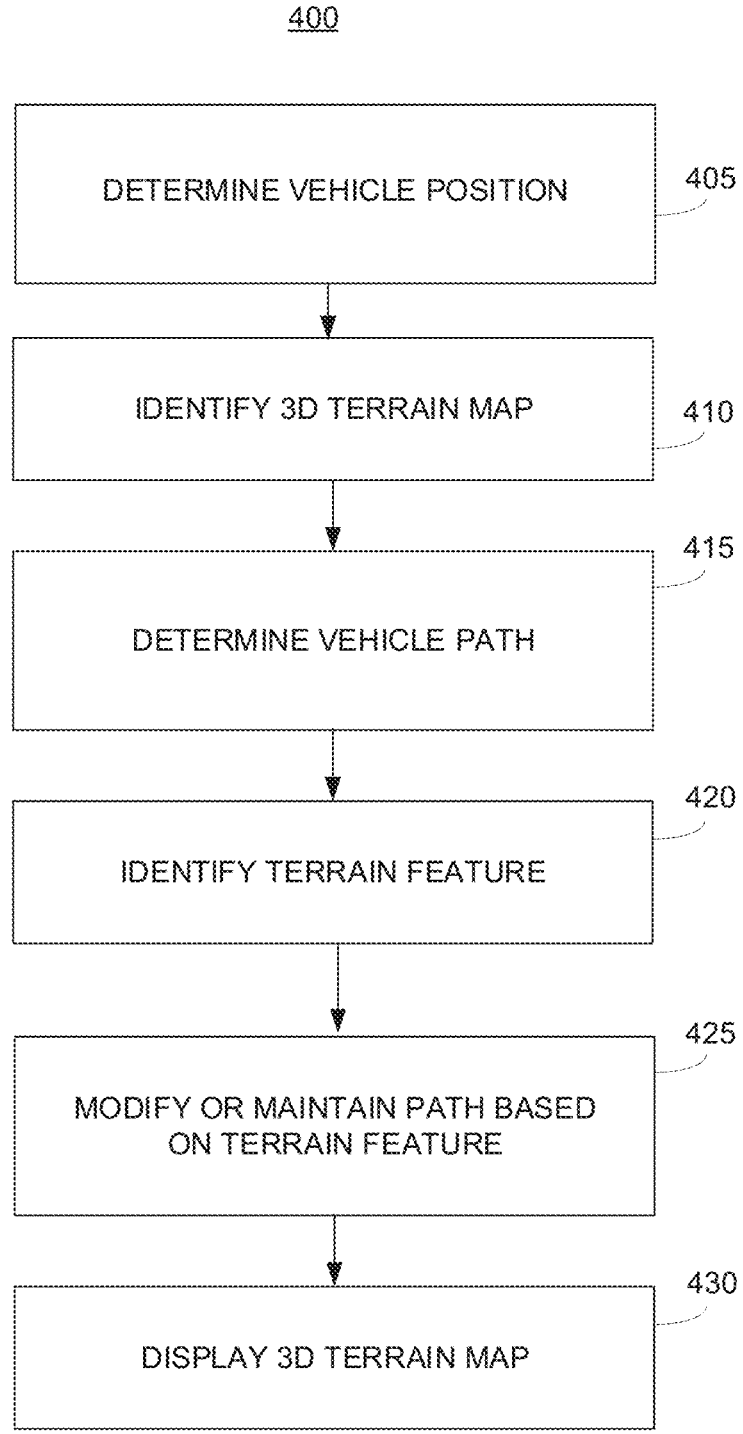
FIG. 4 is a flow diagram illustrating an example of another process according to various embodiments of the present disclosure.

FIG. 4 illustrates an example of a method 400 that may be implemented by a vehicle control system (e.g., the systems depicted in FIGS. 1A, 1B, and/or 2). In this example, method 400 includes determining a position of a vehicle (e.g., coupled to the vehicle control system) based on the location data from a positioning system (405), identifying a 3D terrain map associated with the position of the vehicle; (410), determining a path for the vehicle based on the 3D terrain map (415), identifying a terrain feature based on data from a sensor system (420), modifying or maintaining the path of the vehicle based on the identified terrain feature (425), and displaying the 3D terrain map (430).

In some embodiments, the system implementing method 400 may include a steering control system (such as steering system 166 in FIG. 2) for controlling operation of the vehicle. In some embodiments, the steering control system may be implemented as a component of a user interface (e.g., user interface B150 in FIG. 1B). The steering control system may be adapted to drive and steer the vehicle along the determined path.

The system may further include a display (e.g., as a component of user interface B150 in FIG. 1B) and the system may display (430) a two-dimensional representation of the three-dimensional map on the display. Similarly, the system may display a visual representation of the path in conjunction with the display of the three-dimensional map on the display.

The system may determine a path for the vehicle (415) based on a variety of factors and criteria. For example, the system may generate a path for an agricultural vehicle (such as a tractor) coupled to a vehicle implement (such as a seeder) to traverse a section of terrain (such as a field to be seeded).

The system may identify one or more terrain features (420) associated with a section of terrain at any suitable time, including during initial generation of the path or after the vehicle has begun traversing the path. The system may analyze the identified terrain features to determine the vehicles path (415) as well as to modify or maintain (425) an existing path for a vehicle. For example, the system may identify a terrain feature comprising a slope, identify the steepness of the slope, and determine whether the slope of the terrain feature is traversable by the vehicle. In some embodiments, the system may halt operation of a steering control system automatically or semi-automatically controlling the vehicle in response to identifying one or more terrain features (e.g., turning manual control over to a human operator). The system may additionally or alternatively generate an alert to an operator to provide a warning about a particular terrain feature in the path of the vehicle, as well as to suggest a course of action (e.g., turning left to avoid an object, reducing/increasing tire pressure, etc.).

In many cases, it is common for vehicle implements (such as sprayers) to travel up, over, through rolling obstacles such as terraces and drain channels. These obstacles can cause transient motion away from the desired path as the vehicle control system tries to quickly react to the changing terrain. For small or short obstacles it would be better if the vehicle control system did nothing to compensate for the obstacle disturbance, as the disturbance to the driven path is minimized by allowing the vehicle to drive straight over rather than taking large control action to compensate for the disturbance. The control compensation could cause transient effects that can persist longer than the obstacle transient effects if no corrective control action was taken. In some embodiments, the system may analyze the features of a 3D terrain map to identify the duration of such a disturbance and minimize the amount of corrections it tries to make based on what could be a potentially large error feed-back from GNSS and INS sensors.

Embodiments of the present disclosure may thus provide automatic or semi-automatic steering systems that evaluate the terrain to be traversed by a vehicle based on historic map data (e.g., from a 3D terrain map) and/or from sensor data collected in real-time or near-real-time. By contrast, conventional systems may only measure the current pose of the vehicle and conventional controllers may continuously try to get the vehicle on the path, often leading to the control reaction being too late and, in some cases, not optimal considering the duration of the disturbance. This could be a longer change in roll due to hillside versus a very short change in roll due a smaller hole or hump, or a short period of time involved in crossing below a ditch.

For example, if the system identifies a terrain features such as a hole or ditch, the system may utilize data from a sensor system (e.g., including a lidar sensor and/or image capturing device) to evaluate if the terrain feature is passable and then modify the path, speed, or other characteristic of the vehicle (if necessary) in order to traverse the terrain feature in an optimal manner.

In this manner, embodiments of the present disclosure help to improve the performance and response time of vehicle control systems, especially when running at high speed. Embodiments of the present disclosure may utilize measurements from a sensor (e.g., a measured oscillation after hitting a bump) to determine a roughness coefficient for the surface of the terrain, thus helping to identify terrain with dirt clods, rocks, or other small features that may be passable by the vehicle but may warrant passing over them at a reduced speed.

In some cases, when a vehicle (such as a tractor) is driving on sloped ground, the roll and pitch angles that the vehicle experiences may change with the direction the vehicle body is facing. For example, if the vehicle is facing up the slope then the vehicle is pitched up, if the vehicle is traveling along the slope then the vehicle is rolled to one side.

When the expected slope of the ground is known to the control system by analyzing a 3D terrain map, the system may correlate the current vehicle roll and pitch angles with the expected roll and pitch angles, thereby allowing the system to calculate a vehicle body heading measurement. This heading measurement can be fused in with other sensor data to help provide a better vehicle state estimate, improving the robustness and accuracy of the control system performance.

Additionally, vehicle (and vehicle implement) control can be improved by embodiments of the present disclosure by, for example, using a 3D terrain map to predict future terrain changes or disturbances the vehicle may encounter. Such future information can be used to allow the vehicle to take preemptive control action to minimize the effect of a future terrain change or disturbance.

The system may determine the path of a vehicle based on a task to be performed by the vehicle or a desired outcome from the vehicle traversing the path. For example, the system may determine the vehicle's path to help optimize water management, provide safety for the vehicle's operator in hilly or sloped terrain (e.g., from rolling the vehicle), and account for land leveling and erosion (e.g., by tracking how land is changing over time to plan the use of terraces).

Furthermore, the system may plan paths for vehicles to run across a slope compared to up/down the slope in order to conserve fuel. The system may further update the 3D terrain map as the vehicle traverses the path (e.g., to identify boundaries, hay bales, obstacles) to help improve the accuracy of the map. Additionally, embodiments of the present disclosure may be used to enhance the capability of control systems for vehicles with limited positioning systems (e.g., only GNSS) by utilizing the information from the vehicle's positioning system in conjunction with the information in the 3D terrain map.

In some embodiments, the system may plan the path for the vehicle based on a 3D terrain map in order to help segment a non-convex field and determine the driving direction in such a field for the optimal (e.g., based on fuel usage and time) coverage. The system may also plan the path of a vehicle such that the guess row between two passes with an implement (such as a seeder) is constant even if the terrain is rolling to help provide better coverage in the field and allow farmers to plan usage of their fields more optimally.

The system may utilize information from the 3D terrain map and information from a sensor system to detect the headland of a field in order to determine a path for a vehicle that provides full implement coverage (e.g., identifying at what points on the path to lift/lower the implement to cover the field). In conventional systems, by contrast, a user has to define a boundary by driving along the field. Furthermore, the user also has to define any exclude boundaries (obstacles) in the field, and the boundaries are assumed to be static for a given field.

In some embodiments, the system may identify vegetation to be planted by the vehicle on at least a portion of terrain depicted in the three-dimensional terrain map, determine a water management process for irrigating the vegetation, and determine the path of the vehicle to plant the vegetation that corresponds with the water management process. Similarly, the system may determine a respective expected fuel consumption rate for each of a plurality of potential paths for the vehicle, and determine the path of the vehicle based on the determined fuel consumption rates (e.g., selecting the path having the best fuel consumption rate).

Additionally or alternatively, the system may determine a respective expected time for the vehicle to traverse each of a plurality of potential paths for the vehicle, and determine the path of the vehicle based on the determined traversal times (e.g., selecting the path having the shortest time). In some embodiments, selecting a path based on travel/traversal time of a section terrain may depend on a particular terrain feature. For example, the system may determine a path to completely ignore the feature (e.g., if it is easily passable) or take action to avoid it (e.g., if the feature is impassible, would cause harm to the vehicle, would cause the vehicle to get stuck, etc.). The vehicle control system may also cause the vehicle to slow down and take a longer path to avoid a terrain feature. In some cases, the time difference may be significant (especially for a big field), and in some embodiments the vehicle control system may determine any additional time required for avoidance and report it to a human operator (e.g., the field planner).

The system may compare a terrain feature identified based on sensor data to a corresponding terrain feature in the three-dimensional map and modify a feature of the corresponding terrain feature in the three-dimensional map based on the identified terrain feature.

Embodiments of the present disclosure may identify a boundary of an area to be traversed by the vehicle (e.g., a fence surrounding a field), determine a turn radius of the vehicle, and determine the path of the vehicle to traverse the identified area within the turn radius of the vehicle and without colliding with the boundary. In this manner, the system can help ensure that a vehicle and its implements safely traverse the headland of a field without straying into any obstacles or boundaries at the edge of the field.

The path of the vehicle may be determined based on the functions to be performed by one or more implements coupled to (or integrated with) a vehicle. For example, the system may identify one or more points along the path at which to engage or disengage a feature of an implement coupled to the vehicle.

The system may modify or maintain the path of the vehicle (425) based on a variety of criteria, including based on: determining an expected time for the vehicle to traverse or avoid the identified terrain feature, and/or determining whether the identified terrain feature is traversable by the vehicle (e.g., a fence or lake vs. a small ditch or stream).

The system may identify terrain features (420) based on a variety of sensor data. For example, in a sensor system that includes an accelerometer, identifying the terrain feature may include identifying a roughness level of the terrain based on data from the accelerometer as the vehicle passes over the terrain. In some embodiments, the system may adjust the speed for the vehicle based on the roughness level of the terrain.

In another example, in a sensor system that includes a gyroscopic sensor, identifying a terrain feature (e.g., a slope/hill) may include determining one or more of: a roll angle for the vehicle, a pitch angle for the vehicle, and a yaw angle for the vehicle. In alternate embodiments, other types of sensors (e.g., an accelerometer) may also be used to determine attitude characteristics of a vehicle.

IV. Vehicle Implement Control

Figure 5:
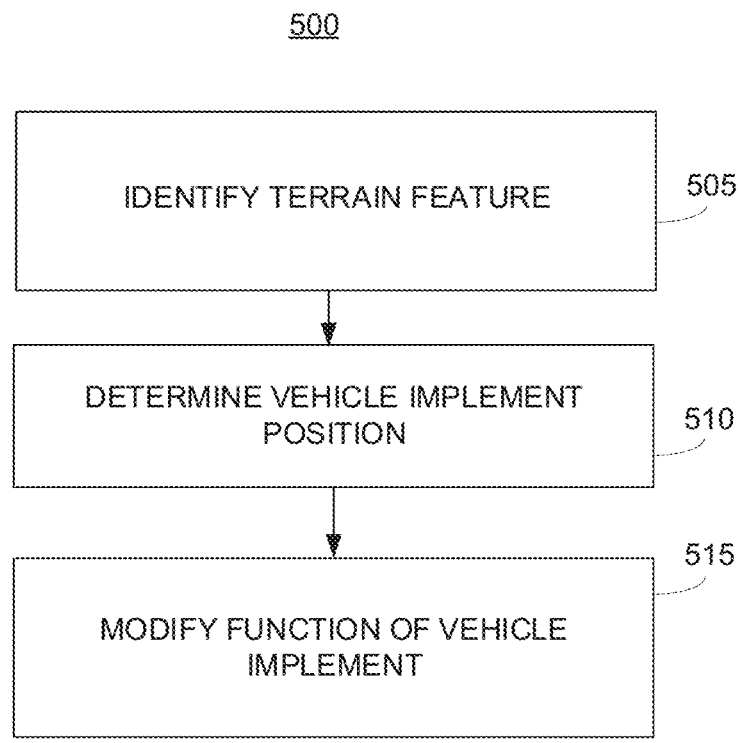
FIG. 5 is a flow diagram illustrating an example of yet another process according to various embodiments of the present disclosure.

FIG. 5 provides an example of a method 500 that may be used to control the features and functions of a variety of vehicle implements. As with all the methods described in FIGS. 3-6, the features of method 500 may be practiced alone, in part, or in conjunction with any of the other methods described herein. Method 500 may be performed by a vehicle implement control system (e.g., control system B100 shown in FIG. 1B). The vehicle implement control system may be separate from, or implemented by, a vehicle control system.

Embodiments of the present disclosure may be implemented in conjunction with a variety of vehicle implements, including (for example): a seeder, a fertilizer spreader, a plow, a disc, a combine, baler, a rake, a mower, a harrow bed, a tiller, a cultivator, a pesticide sprayer, a mulcher, a grain cart, a trailer, a conditioner, and combinations thereof. The vehicle implement may be integrated with a vehicle (e.g., as in the case of a combine) or coupled to a vehicle (e.g., in the case of a tractor coupled to a plow).

Figure 10:
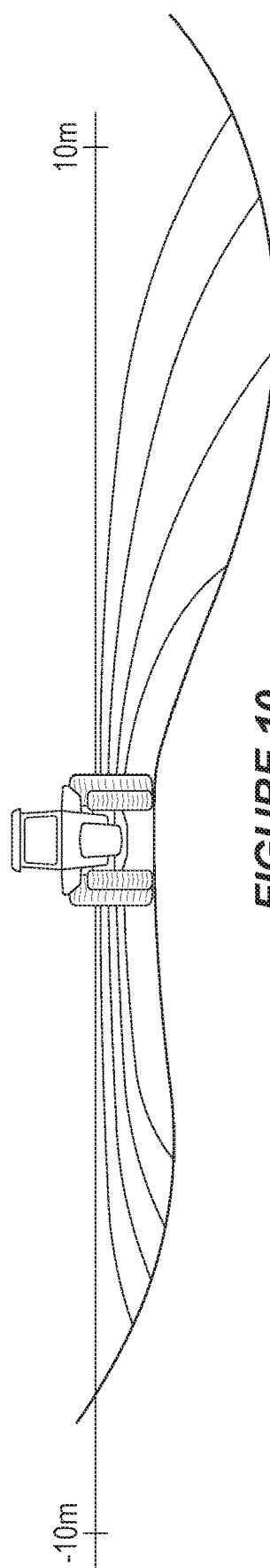

For example, a fertilizer spreader may need to adjust the spreading pattern a lot depending on terrain to maintain an even distribution and coverage width. Embodiments of the present disclosure can control the operation of the fertilizer (or provide data regarding the terrain to the spreader itself) in order for the spreader to adjust accordingly. Similarly, modern fertilizer spreaders can adjust the width and amount of fertilizer on the go to perform precision farming variable rate applications, and the vehicle implement control system of the present disclosure can help improve and optimize the spreading pattern of the spreader. In FIG. 10, for example, a spreader is depicted with a first section of terrain (on the left) having a relatively higher elevation than terrain on the right. In this example, the spreading pattern may be adjusted by the system to spread fertilizer out to about 10 meters on the right side, and a lesser distance on the left side, to account for the difference in the terrain.

In the example depicted in FIG. 5, method 500 includes identifying one or more features of a section of terrain (e.g., based on: a three-dimensional map including the section of terrain, and data from a sensor system) (505), determining a position of the vehicle implement (e.g., based on data from the sensor system and the one or more identified terrain features) (510), and modifying a function of the vehicle implement based on the one or more identified terrain features and the position of the vehicle implement (515).

In some embodiments, the system may include a positioning system, and the positioning of the vehicle implement may (additionally or alternatively to other data) be determined based on data from the positioning system. In one particular example, the positioning system includes a global navigation satellite system (GNSS) and does not include an inertial navigation system (INS). Instead of using an INS, the system may identify one or more terrain features by comparing the three-dimensional terrain map to data from the GNSS and data from the sensor system. In some embodiments, the system may modify the three-dimensional map in response to comparing the three-dimensional terrain map to data from the GNSS and data from the sensor system (e.g., to update the 3D terrain map). The sensor system may include any suitable number and type of sensor, including a radar sensor, a lidar sensor, and/or an imaging device (such as a camera).

In cases where the vehicle implement is coupled to a vehicle, determining the position of the vehicle implement may be based on determining a size, shape, and weight for the vehicle implement, and identifying an articulation angle between the vehicle and the vehicle implement.

In some embodiments, the vehicle implement may comprise a portion that is adjustable, and modifying the function of the vehicle implement (515) includes adjusting the portion of the vehicle implement. For example, a portion of a vehicle implement, such as a plow or disc, may be raised (to disengage with the soil) or lowered (to engage with the soil). The system may accordingly raise or lower the portion of the vehicle implement based on, for example, a height of a determined terrain feature (e.g., to avoid the feature with the implement and/or avoid damage to the implement).

For example, for vehicle implements used in harvest applications with header control, the height of a portion of the implement height can be controlled more efficiently compared to conventional systems where such control is typically based on wheels or feelers that are close to the working point, but provide no (or very little) ability to look ahead at terrain to be traversed.

In another example where a vehicle implement is coupled to a vehicle, modifying the function of the vehicle implement may includes identifying a first path of the vehicle across the section of terrain and identifying a second path of the vehicle implement across the section of terrain, wherein the first path and the second path are different. This may occur, for example, in cases where the vehicle is towing the implement behind the vehicle.

In such cases, the vehicle implement function may be modified based on the difference between the first path and the second path. For example, the system may move a portion of the vehicle implement to avoid collision with a terrain feature that is in the second path (for the vehicle implement) but is not in the first path (for the vehicle). For example, the terrain feature may include an obstacle that may damage the implement or cause it to get stuck, such as a hole, a furrow, a body of water, or an obstacle extending above a ground plane of the terrain (such as boulder, tree, or another vehicle).

In some embodiments, where the vehicle implement is coupled to a vehicle, determining the position of the vehicle implement may be further based on receiving, from a system coupled to the vehicle, a current velocity of the vehicle and a current heading of the vehicle. For example, a vehicle control system coupled to the vehicle (e.g., as shown in FIG. 2) could communicate with vehicle implement control system coupled to the vehicle implement control system (e.g., implemented using system B100 in FIG. 1B) using wireless transceivers coupled to both systems (e.g., transceiver B160 in FIG. 1B).

The system may determine the position of the vehicle implement based on determining a current heading of the vehicle implement. The system may also determine that the current heading of the vehicle is different from the current heading of the vehicle implement. Such a case can occur when a vehicle towing a vehicle implement is making a turn.

Figure 11:
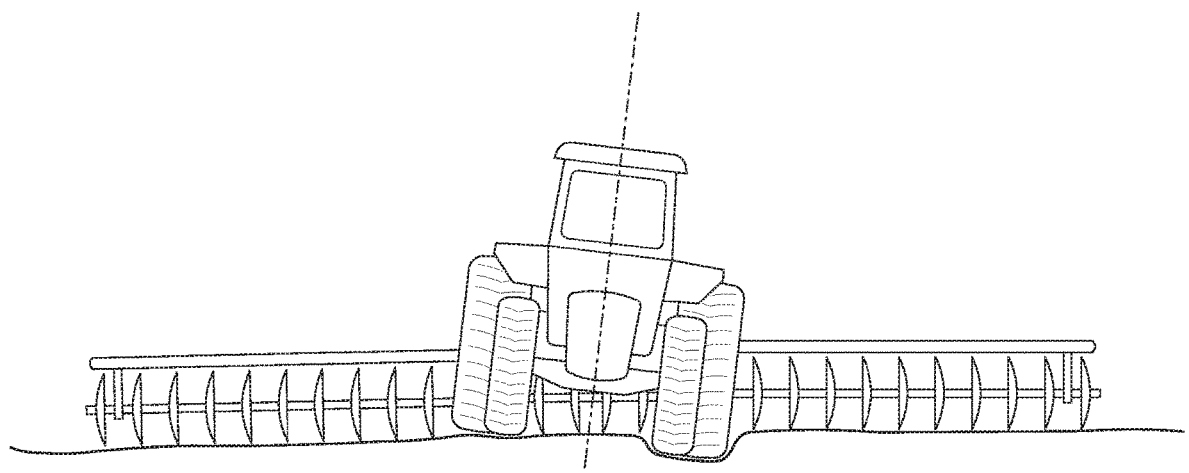

In some cases, the assumption that a vehicle (such as a tractor) and a vehicle implement coupled to the vehicle (such as a plow coupled to the tractor) are on the same plane is not valid for fast rolling terrain, particularly when the vehicle operates at faster driving speeds and in situations where the attitude of the vehicle rolls to one side or another due to a hole or a furrow. FIG. 11 illustrates one such example, where a vehicle towing an implement (such as a disc) has its left set of wheels in a furrow as it moves forward. Embodiments of the present disclosure may utilize data from a 3D terrain map and data from a sensor system to determine how the terrain will be rolling and make adjustments (e.g., in the path of the vehicle or the vehicle's speed) to handle holes or furrows.

In some embodiments, the system may alleviate the need for a positioning system with GNSS by determining characteristics of the vehicle implement (such as size, shape, weight, geometry, etc.), and determining an articulation angle between the vehicle implement and vehicle, and using data from a terrain map. In some embodiments, data from the sensor may be used by the system to determine a surface model of the ground level and the vehicle implement control system may be used to help control how the implement sinks into the ground. The system may utilize the 3D terrain map to determine the path that the implement will follow relative to the path of the vehicle coupled to the implement.

In some embodiments, the system may filter the level of detail of the 3D terrain map based on the type of implement. For example, some implements may require very detailed information to control, while others (e.g., wide implements) may need less detail.

III. Predicting Terrain Traversability for a Vehicle

For many vehicles, particularly for agricultural vehicles, it is important to be able to avoid damage to fields by traversing portions of terrain with excess moisture. For example, driving into muddy soft parts of the field will lead to extra compaction and deep tracks that are usually undesirable. It is also important for such vehicles to avoid getting stuck in mud pools or other bodies of water to avoid time consuming (and expensive) recovery efforts for the vehicle.

Additionally, given the expense of many modern agricultural vehicles and their cost of operation, it is beneficial for operators of such vehicles to optimize the usage of such vehicles. One factor that may have considerable impact on the operating efficiency of an agricultural vehicle is the degree to which tracks or wheels of the vehicle slip (e.g., due to mud and wet conditions) while following a particular path.

Among other things, embodiments of the present disclosure can help optimize the usage of a vehicle by predicting the wheel slippage of the vehicle on the path ahead of the vehicle. For example, optimal wheel slip depends on the soil type (e.g., concrete, firm soil, tilled soil, or soft/sandy soil), but are typically in the range 8 to 15% slip.

In some embodiments, the system can report the predicted rate of wheel slippage along various points of a path to be followed by a vehicle. For a specific vehicle, the operator (or a vehicle control system operating in conjunction with embodiments of the disclosure) can adjust the wheel slip by changing the tyre pressure, change the weight on the vehicle or by changing the load.

For example, many modern vehicles allow tire pressure to be inflated or deflated during operation in the field. The weight of a vehicle or implement coupled to the vehicle may be changed by changing the ballast (additional weights) on the vehicle. Weights may also be modified by planning some tasks better based on knowledge about soft spots in the field identified by embodiments of the present disclosure.

For example, during harvest the trailer transporting goods can be loaded in the front of the trailer first to add more weight to the tractor and reduce the weight on the trailer axles. For some implements (e.g., carried in the 3-point hitch and by the ground when working the soil) it is possible to raise the 3-point hitch and get more of the weight from the implement on the tractor rear axle.

In some cases, the load of the vehicle may be changed by, for example, planning of tasks where the vehicle is either bringing material (e.g. fertilizer to the field) and gradually reducing the weight transported as the material is distributed, or the vehicle is removing material (e.g. harvest crops where a trailer is gradually filed with material). For example, the path of the vehicle may thus be planned by the system to traverse sections of terrain having higher levels of moisture when the vehicle is lighter.

In some scenarios the system may re-route the path of a vehicle to avoid a specific wet area in the field and plan around it to avoid getting stuck and/or damage to the field.

Figure 6:
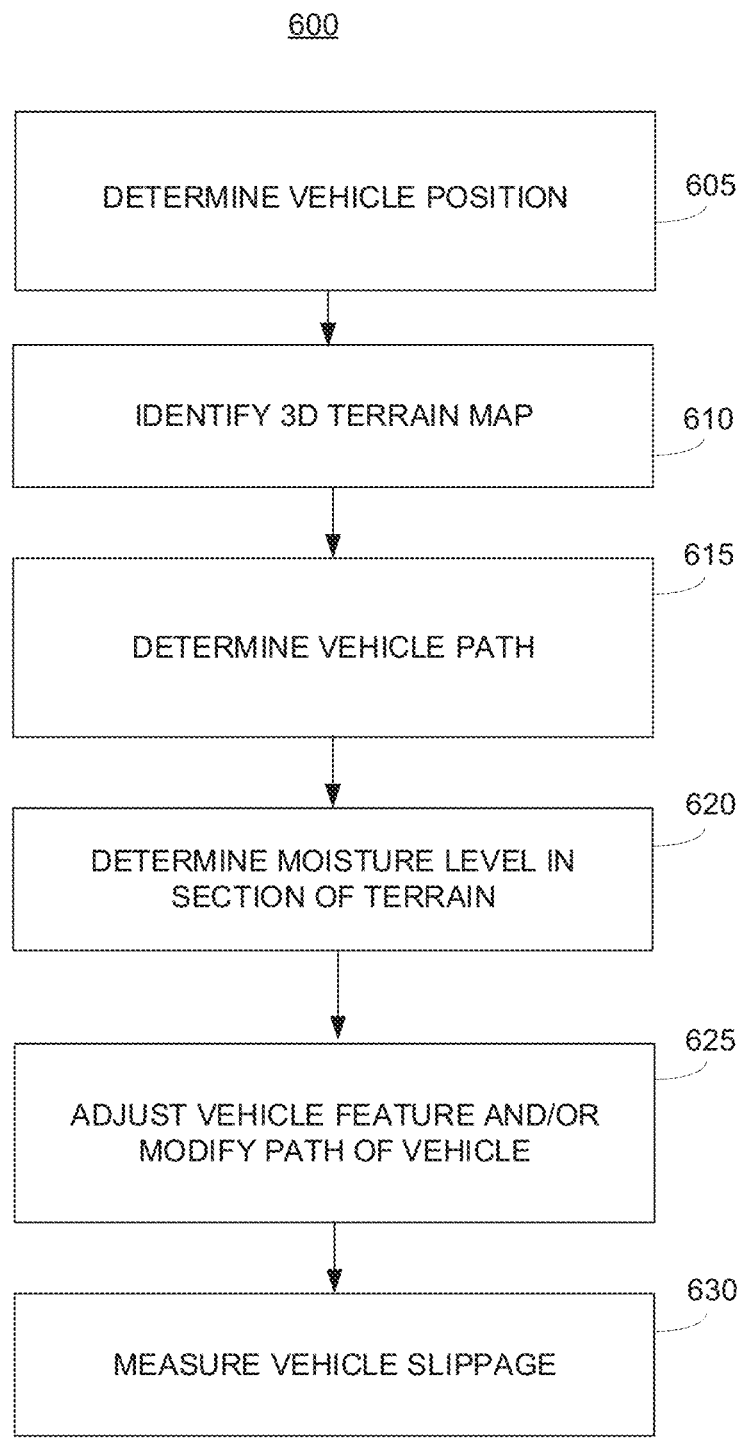
FIG. 6 is a flow diagram illustrating an example of yet another process according to various embodiments of the present disclosure.

FIG. 6 illustrates an example of a method for predicting slippage of a vehicle according to various aspects of the present disclosure. Method 600 may be performed by a vehicle control system (such as those described previously). In this example, method 600 includes determining a position of the vehicle based on the location data from a positioning system (605), identifying a three-dimensional terrain map associated with the position of the vehicle (610), determining a path for the vehicle based on the three-dimensional terrain map (615), determining, based on data from the sensor system and the three-dimensional terrain map, a level of moisture associated with a section of terrain along the path of the vehicle (620). Method 600 further includes, in response to determining the level of moisture associated with the section of terrain, performing one or more of: adjusting a feature of the vehicle prior to traversing the section of terrain, and modifying the path of the vehicle prior to traversing the section of terrain (625), and measuring slippage of the vehicle while traversing a section of terrain (630).

In some embodiments, the system may determine whether the section of terrain is traversable by the vehicle without slipping, as well as predicting a degree of slippage (e.g., as a percentage described above) the vehicle is likely to experience traversing the section of terrain. In some embodiments, the system may determine a rate of fuel consumption associated with the degree of slippage. Fuel consumption rates beyond a predetermined threshold may, for example, lead to the section of terrain being deemed non-traversable due to the high amount of slippage and associated fuel consumption.

In addition to predicting the likely rate of slippage, the system may measure slippage of the vehicle while traversing the section of terrain (630). The rate of slippage may be recorded and added to the 3D terrain map to aid in planning future vehicle paths.

The system may adjust a variety of features of the vehicle (625) in response to the determined moisture level in a section of terrain. For example, the system may inflate or deflate one or more tires coupled to the vehicle. The system may also modify the path of the vehicle (625) by, for example: identifying a first expected weight associated with the vehicle at a first point on the path of the vehicle; identifying a second expected weight associated with the vehicle at a second point on the path of the vehicle, the second weight being different than the first weight; and modifying the path of the vehicle to traverse the section of terrain when the vehicle is associated with the second expected weight.

For example, the second weight may be less than the first weight due to consumption (e.g., fuel) or distribution (e.g., seed or fertilizer) of a material carried by the vehicle or a vehicle implement coupled to the vehicle along the path of the vehicle. By contrast, the second weight may be greater than the first weight due to addition of a material carried by the vehicle or a vehicle implement coupled to the vehicle along the path of the vehicle, such as crops harvested along the path travelled by the vehicle and implement. In this manner, the system can plan to have a vehicle traverse a particularly wet section of a field when it is at its lightest weight (to avoid sinking), or traverse the section at its heaviest weight to help give the vehicle or its implements traction to get through the section. The system may also modify the path of the vehicle to avoid the section of terrain altogether.

The system may identify the level of moisture in a section of terrain based on data from a variety of sensors. In some embodiments, for example, the sensor system includes an imaging device, and determining the level of moisture associated with a section of terrain includes: capturing a first image of at least a portion of the section of the terrain at a first resolution using the imaging device; capturing a second image of at least a portion of the section of the terrain at a second resolution using the imaging device; capturing a third image of at least a portion of the section of the terrain at a third resolution using the imaging device, wherein the first resolution is greater than the second resolution, and the second resolution is greater than the third resolution; and geo-referencing the first, second, and third images based on data from the positioning system and the three-dimensional terrain map.

In some embodiments, in addition to (or as an alternative to) identifying the moisture level of a section of terrain, the system may determine the suitability of traversing the section of terrain based on other characteristics of the terrain. For example, such a determination may be made based on operator comfort and/or wear and tear on the vehicle or implement (e.g., based on a roughness determination for the ground, avoiding particularly rough terrain that would be uncomfortable for the operator and could cause damage to the equipment through excessive jolting and vibration). In another example, the system may analyze the type of soil in a section of terrain (e.g., based on data from the 3D terrain map or sensor system) to determine whether to traverse a section of terrain. In a specific example, the system may opt to avoid traversing very sandy soil in favor of traversing a nearby patch of gravel to avoid slippage of the wheels of the vehicle.

Such images may be taken of regions of interest in front of the vehicle—typically along the planned path for the vehicle. One example could be to take a high-resolution image patch in front of the vehicle, a medium resolution image patch further away and a third low resolution patch further away. The images are geo-referenced so that they can be correlated to the measured slippage at that location.

In some embodiments, determining the level of moisture associated with the section of terrain includes identifying a depression in the section of terrain based on the three-dimensional terrain map. The level of moisture may also be determined based on analyzing weather data indicating an actual or forecast level of precipitation associated with the section of terrain. Determining the level of moisture associated with the section of terrain may also include performing an image recognition process on an image of the section of terrain captured by the image capturing device. (e.g., to identify standing water from surrounding soil).

In some embodiments, the geometry (slope) of the field may be measured and geo-referenced. This can either be based on data from a GNSS or INS, data from a 3D terrain map, or from data from sensors such as lidar or stereo cameras. The slip corresponding to the image locations may be measured, geo-referenced and used as a label to train a slippage prediction model. Additional feature inputs may be used to train the slippage prediction model, including features of the vehicle.

For example, the current tire pressure of the vehicle, the current axle vertical load of the vehicle, and/or the current load (e.g., engine load, power take-off load, and/or traction load) may each be geo-referenced and logged and used as training features for the model. Other input features may include the model/type of the vehicle the model/type of a vehicle implement, the load on a trailer (e.g., based on weighing sells or fill level of sprayers or slurry spreaders), the depth to which the vehicle is sinking into the ground (e.g., measured by the terrain sensors on stable ground), the speed of the vehicle, a task being performed by the vehicle and/or vehicle implement, the type of crop being planted, tended, or harvested, and/or other features.

An axle load on the driving wheels and the load pulled may change during operation both due to the rough surface and variations in the soil. The load may also change due to loading material on the vehicle or off the vehicle. For example, for an implement hitched to a vehicle (e.g., a tractor) to work the soil, the load may depend on field geometry, speed, soil conditions, and other factors.

The weight may depend on how much of the implement weight that is carried by the tractor and how much of the drawing forces that are giving a resulting downforce on the driving axles.

Slippage measurements for different vehicles may also be used in training a slippage prediction model. The slip input given for a specific vehicle may be different for another vehicle with different load, tires, etc. Accordingly, the training data gathered by the system may be processed to be vehicle independent and normalized. For example, if a load is changing, it may be taken into account for that data input before training.

The predicted rate of slippage for a vehicle may be determined from a variety of data sources. For example, the slippage rate may be determined based on data from a camera/sensor or farm management information system along the vehicle path. Prediction values from such data may be calibrated based on actual measured slip for the current given state of the machine (e.g., current tire wear, load, tire pressure, weight distribution etc.).

EXAMPLES

The following are examples of embodiments of the present disclosure. Any of the following examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

1. A terrain mapping system for a vehicle, the system comprising:
   a processor;
   a sensor system coupled to the processor for collecting three-dimensional terrain data;
   a digital camera coupled to the processor for capturing terrain image data;
   a positioning system coupled to the processor for determining location data for the vehicle; and
   memory coupled to the processor and storing instructions that, when executed by the processor, cause the terrain mapping system to perform operations comprising:
      identifying, based on data received from the sensor system, digital camera, and positioning system, a ground surface topography for a section of terrain;
      identifying, based on the data received from the sensor system, digital camera, and positioning system, a topography of vegetation on the section of terrain; and
      generating a two-dimensional representation of a three-dimensional terrain map, the three-dimensional terrain map including the ground surface topography for the section of terrain and the topography of vegetation on the section of terrain.

2. The terrain mapping system of example 1, wherein generating the three-dimensional terrain map includes identifying a plurality of objects within the section of terrain on the terrain map, and presenting a respective visual indicator on the map for each respective object representing the object is traversable by the vehicle.

3. The terrain mapping system of example 1, further comprising:
   a display screen coupled to the processor, wherein the memory further stores instructions for causing the terrain mapping system to display the three-dimensional terrain map on the display screen.

4. The terrain mapping system of example 1, wherein the memory further stores instructions for transmitting an electronic communication comprising the three-dimensional map to a vehicle control system.

5. The terrain mapping system of example 1, wherein the positioning system comprises a global navigation satellite system (GNSS) or a local positioning system (LPS).

6. The terrain mapping system of example 1, wherein the sensor system includes one or more of: a radar sensor, a lidar sensor, and an imaging device.

7. The terrain mapping system of example 1, wherein generating the three-dimensional terrain map includes identifying a height of a portion of the vehicle above the ground surface.

8. The terrain mapping system of example 7, wherein generating the three-dimensional terrain map includes determining a depth of tracks made by the vehicle based on a change in the height of the portion of the vehicle above the ground surface.

9. The terrain mapping system of example 1, wherein generating the three-dimensional terrain map includes determining a height of a portion of the vegetation on the terrain above the ground surface.

10. The terrain mapping system of example 1, wherein generating the three-dimensional terrain map includes modifying a pre-existing feature of a pre-existing three-dimensional terrain map based on the ground surface topography for the section of terrain and the topography of vegetation on the section of terrain.

11. The terrain mapping system of example 1, wherein the three-dimensional terrain map is further generated based on data from a sensor system coupled to a second vehicle.

12. The terrain mapping system of example 1, wherein generating the three-dimensional terrain map includes identifying a level of moisture in the section of terrain.

13. The terrain mapping system of example 12, wherein identifying the level of moisture in the section of terrain includes identifying a first level of moisture in a first portion of the section of terrain, and identifying a second level of moisture in a second portion of the section of terrain, and wherein the first level of moisture is different from the second level of moisture.

14. The terrain mapping system of example 12, wherein identifying the level of moisture in the section of terrain includes identifying a body of water in the section of terrain.

15. The terrain mapping system of example 14, wherein identifying the level of moisture in the section of terrain includes determining whether the vehicle is capable of traversing the body of water.

16. The terrain mapping system of example 14, wherein identifying the level of moisture in the section of terrain includes determining a rate of flow of water through the body of water.

17. The terrain mapping system of example 14, wherein identifying the level of moisture in the section of terrain includes determining a depth of the body of water.

18. The terrain mapping system of example 14, wherein generating the three-dimensional terrain map includes identifying a path for the vehicle to circumvent the body of water.

19. A tangible, non-transitory computer-readable medium storing instructions that, when executed by a terrain mapping system, cause the terrain mapping system to perform operations comprising:
identifying, based on data received from a sensor system, a digital camera, and a positioning system, a ground surface topography for a section of terrain;
identifying, based on the data received from the sensor system, digital camera, and positioning system, a topography of vegetation on the section of terrain; and
generating a two-dimensional representation of a three-dimensional terrain map, the three-dimensional terrain map including the ground surface topography for the section of terrain and the topography of vegetation on the section of terrain.

20. A method comprising:
identifying, by a terrain mapping system based on data received from a sensor system, a digital camera, and a positioning system, a ground surface topography for a section of terrain;
identifying, by the terrain mapping system based on the data received from the sensor system, digital camera, and positioning system, a topography of vegetation on the section of terrain; and
generating, by the terrain mapping system, a two-dimensional representation of a three-dimensional terrain map, the three-dimensional terrain map including the ground surface topography for the section of terrain and the topography of vegetation on the section of terrain.

21. A vehicle control system comprising:
a processor;
a sensor system coupled to the processor;
a positioning system coupled to the processor for determining location data for the vehicle; and
memory coupled to the processor and storing instructions that, when executed by the processor, cause the vehicle control system to perform operations comprising:
determining a position of a vehicle coupled to the vehicle control system based on the location data from the positioning system;
identifying a three-dimensional terrain map associated with the position of the vehicle;
determining a path for the vehicle based on the three-dimensional terrain map;
identifying a terrain feature based on data from the sensor system; and
modifying or maintaining the path of the vehicle based on the identified terrain feature.

22. The vehicle control system of example 21, wherein the vehicle control system further comprises a steering control system for controlling operation of the vehicle.

23. The vehicle control system of example 22, wherein the steering control system is adapted to drive and steer the vehicle along the determined path.

24. The vehicle control system of example 21, further comprising a display coupled to the processor, wherein determining the path for the vehicle includes displaying a two-dimensional representation of the three-dimensional map on the display.

25. The vehicle control system of example 23, wherein determining the path for the vehicle includes displaying a visual representation of the path in conjunction with the display of the three-dimensional map on the display.

26. The vehicle control system of example 21, wherein modifying or maintaining the path of the vehicle based on the identified terrain feature includes determining an expected time for the vehicle to traverse or avoid the identified terrain feature.

27. The vehicle control system of example 21, wherein modifying or maintaining the path of the vehicle based on the identified terrain feature includes determining whether the identified terrain feature is traversable by the vehicle.

28. The vehicle control system of example 21, wherein the sensor system includes one or more of: an accelerometer, a gyroscopic sensor, and a magnetometer.

29. The vehicle control system of example 28, wherein the sensor system includes an accelerometer and wherein identifying the terrain feature includes identifying a roughness level of the terrain based on data from the accelerometer.

30. The vehicle control system of example 29, wherein modifying or maintaining the path of the vehicle based on the identified terrain feature includes determining a speed for the vehicle based on the roughness level of the terrain.

31. The vehicle control system of example 28, wherein the sensor system includes a gyroscopic sensor, and identifying the terrain feature includes determining one or more of: a roll angle for the vehicle, a pitch angle for the vehicle, and a yaw angle for the vehicle.

32. The vehicle control system of example 21, wherein determining the path of the vehicle includes:
identifying a terrain feature comprising a slope;
identifying a steepness of the slope; and
determining whether the slope of the terrain feature is traversable by the vehicle.

33. The vehicle control system of example 21, wherein determining the path of the vehicle includes:
identifying vegetation to be planted by the vehicle on at least a portion of terrain depicted in the three-dimensional terrain map;
determining a water management process for irrigating the vegetation; and
determining the path of the vehicle to plant the vegetation that corresponds with the water management process.

34. The vehicle control system of example 21, wherein determining the path of the vehicle includes:
determining a respective expected fuel consumption rate for each of a plurality of potential paths for the vehicle; and
determining the path of the vehicle based on the determined fuel consumption rates.

35. The vehicle control system of example 21, wherein determining the path of the vehicle includes:
determining a respective expected time for the vehicle to traverse each of a plurality of potential paths for the vehicle; and
determining the path of the vehicle based on the determined traversal times.

36. The vehicle control system of example 21, wherein determining the path of the vehicle includes:
comparing the terrain feature identified based on the sensor data to a corresponding terrain feature in the three-dimensional map; and
modifying a feature of the corresponding terrain feature in the three-dimensional map based on the identified terrain feature.

37. The vehicle control system of example 21, wherein determining the path of the vehicle includes:
identifying a boundary of an area to be traversed by the vehicle;
determining a turn radius of the vehicle; and
determining the path of the vehicle to traverse the identified area within the turn radius of the vehicle and without colliding with the boundary.

38. The vehicle control system of example 21, wherein determining the path of the vehicle includes identifying one or more points along the path at which to engage or disengage a feature of an implement coupled to the vehicle.

39. A tangible, non-transitory computer-readable medium storing instructions that, when executed by a vehicle control system, cause the vehicle control system to perform operations comprising:
determining a position of a vehicle coupled to the vehicle control system based on location data from a positioning system;
identifying a three-dimensional terrain map associated with the position of the vehicle;
determining a path for the vehicle based on the three-dimensional terrain map;
identifying a terrain feature based on data from a sensor system; and
modifying or maintaining the path of the vehicle based on the identified terrain feature.

40. A method comprising:
determining, by a vehicle control system, a position of a vehicle coupled to the vehicle control system based on location data from a positioning system;
identifying, by the vehicle control system, a three-dimensional terrain map associated with the position of the vehicle;
determining, by the vehicle control system, a path for the vehicle based on the three-dimensional terrain map;
identifying, by the vehicle control system, a terrain feature based on data from a sensor system; and
modifying or maintaining the path of the vehicle, by the vehicle control system, based on the identified terrain feature.

41. A vehicle implement control system comprising:
a processor;
a sensor system coupled to the processor; and
memory coupled to the processor and storing instructions that, when executed by the processor, cause the vehicle implement control system to perform operations comprising:
identifying one or more features of a section of terrain based on: a three-dimensional map including the section of terrain, and data from the sensor system;
determining a position of the vehicle implement based on data from the sensor system and the one or more identified terrain features; and
modifying a function of the vehicle implement based on the one or more identified terrain features and the position of the vehicle implement.

42. The vehicle implement control system of example 41, wherein the vehicle implement includes one or more of: a seeder, a fertilizer spreader, a plow, a disc, a combine, baler, a rake, a mower, a harrow bed, a tiller, a cultivator, a pesticide sprayer, a mulcher, a grain cart, a trailer, and a conditioner.

43. The vehicle implement control system of example 41, wherein the vehicle implement is integrated with a vehicle.

44. The vehicle implement control system of example 41, wherein the vehicle implement is coupled to a vehicle.

45. The vehicle implement control system of example 41, wherein the vehicle implement comprises a portion that is adjustable, and wherein modifying the function of the vehicle implement includes adjusting the portion of the vehicle implement.

46. The vehicle implement control system of example 45, wherein the adjustable portion of the vehicle implement is adapted to be raised or lowered, and wherein modifying the function of the vehicle implement includes raising or lowering the portion of the vehicle implement based on a height of a determined terrain feature.

47. The vehicle implement control system of example 41, further comprising a positioning system coupled to the processor, wherein determining the position of the vehicle implement is further based on data from the positioning system.

48. The vehicle implement control system of example 47, wherein the positioning system includes a global navigation satellite system (GNSS) and does not include an inertial navigation system (INS).

49. The vehicle implement control system of example 48, wherein identifying one or more terrain features includes comparing the three-dimensional terrain map to data from the GNSS and data from the sensor system.

50. The vehicle implement control system of example 49, wherein identifying the one or more features of the terrain includes modifying the three-dimensional map in response to comparing the three-dimensional terrain map to data from the GNSS and data from the sensor system.
51. The vehicle implement control system of example 41, wherein the vehicle implement is coupled to a vehicle, and wherein determining the position of the vehicle implement includes:
determining a size, shape, and weight for the vehicle implement; and
identifying an articulation angle between the vehicle and the vehicle implement.
52. The vehicle implement control system of example 41, wherein the sensor system includes one or more of: a radar sensor, a lidar sensor, and an imaging device.
53. The vehicle implement control system of example 41, wherein the vehicle implement is coupled to a vehicle, and wherein modifying the function of the vehicle implement includes:
identifying a first path of the vehicle across the section of terrain;
identifying a second path of the vehicle implement across the section of terrain, wherein the first path and the second path are different; and
modifying the function of the vehicle implement based on the difference between the first path and the second path.
54. The vehicle implement control system of example 53, wherein modifying the function of the vehicle implement includes moving a portion of the vehicle implement to avoid collision with a terrain feature that is in the second path but is not in the first path.
55. The vehicle implement control system of example 54, wherein the terrain feature avoided by moving the portion of the vehicle implement includes one or more of: a hole, a furrow, a body of water, and an obstacle extending above a ground plane of the terrain.
56. The vehicle implement control system of example 41, wherein the vehicle implement is coupled to a vehicle, and wherein determining the position of the vehicle implement is further based on receiving, from a system coupled to the vehicle, a current velocity of the vehicle and a current heading of the vehicle.
57. The vehicle implement control system of example 56, wherein determining the position of the vehicle implement includes determining a current heading of the vehicle implement.
58. The vehicle implement control system of example 57, wherein modifying the function of the vehicle implement is further based on determining that the current heading of the vehicle is different from the current heading of the vehicle implement.
59. A tangible, non-transitory computer-readable medium storing instructions that, when executed by a vehicle implement control system, cause the vehicle implement control system to perform operations comprising:
identifying one or more features of a section of terrain based on: a three-dimensional map including the section of terrain, and data from a sensor system;
determining a position of the vehicle implement based on data from the sensor system and the one or more identified terrain features; and
modifying a function of the vehicle implement based on the one or more identified terrain features and the position of the vehicle implement.
60. A method comprising:
identifying, by a vehicle implement control system, one or more features of a section of terrain based on: a three-dimensional map including the section of terrain, and data from a sensor system;
determining, by the vehicle implement control system, a position of the vehicle implement based on data from the sensor system and the one or more identified terrain features; and
modifying, by the vehicle implement control system, a function of the vehicle implement based on the one or more identified terrain features and the position of the vehicle implement.
61. A vehicle control system comprising:
a processor;
a sensor system coupled to the processor;
a positioning system coupled to the processor for determining location data for the vehicle; and
memory coupled to the processor and storing instructions that, when executed by the processor, cause the vehicle control system to perform operations comprising:
determining a position of the vehicle based on the location data from the positioning system;
identifying a three-dimensional terrain map associated with the position of the vehicle;
determining a path for the vehicle based on the three-dimensional terrain map;
determining, based on data from the sensor system and the three-dimensional terrain map, a level of moisture associated with a section of terrain along the path of the vehicle; and
in response to determining the level of moisture associated with the section of terrain, performing one or more of: adjusting a feature of the vehicle prior to traversing the section of terrain, and modifying the path of the vehicle prior to traversing the section of terrain.
62. The vehicle control system of example 61, wherein determining the level of moisture associated with the section of terrain includes determining whether the section of terrain is traversable by the vehicle without slipping.
63. The vehicle control system of example 62, wherein determining whether the section of terrain is traversable by the vehicle includes determining a degree of slippage the vehicle is likely to experience traversing the section of terrain.
64. The vehicle control system of example 63, wherein determining whether the section of terrain is traversable by the vehicle further includes a rate of fuel consumption associated with the degree of slippage.
65. The vehicle control system of example 61, wherein the memory further stores instructions for causing the vehicle control system to measure slippage of the vehicle while traversing the section of terrain.
66. The vehicle control system of example 61, wherein adjusting the feature of the vehicle includes inflating or deflating a tire coupled to the vehicle.
67. The vehicle control system of example 61, wherein modifying the path of the vehicle includes:
identifying a first expected weight associated with the vehicle at a first point on the path of the vehicle;
identifying a second expected weight associated with the vehicle at a second point on the path of the vehicle, the second weight being different than the first weight; and
modifying the path of the vehicle to traverse the section of terrain when the vehicle is associated with the second expected weight.
68. The vehicle control system of example 67, wherein the second weight is less than the first weight.
69. The vehicle control system of example 68, wherein the second weight is less than the first weight due to consumption or distribution of a material carried by the vehicle or a vehicle implement coupled to the vehicle along the path of the vehicle.

70. The vehicle control system of example 67, wherein the second weight is greater than the first weight.

71. The vehicle control system of example 68, wherein the second weight is greater than the first weight due to addition of a material carried by the vehicle or a vehicle implement coupled to the vehicle along the path of the vehicle.

72. The vehicle control system of example 61, wherein modifying the path of the vehicle includes avoiding the section of terrain.

73. The vehicle control system of example 61, wherein the sensor system includes an imaging device, and wherein determining the level of moisture associated with a section of terrain includes:
capturing a first image of at least a portion of the section of the terrain at a first resolution using the imaging device;
capturing a second image of at least a portion of the section of the terrain at a second resolution using the imaging device;
capturing a third image of at least a portion of the section of the terrain at a third resolution using the imaging device, wherein the first resolution is greater than the second resolution, and the second resolution is greater than the third resolution; and
geo-referencing the first, second, and third images based on data from the positioning system and the three-dimensional terrain map.

74. The vehicle control system of example 61, wherein determining the level of moisture associated with the section of terrain includes identifying a depression in the section of terrain based on the three-dimensional terrain map.

75. The vehicle control system of example 61, wherein determining the level of moisture associated with the section of terrain includes analyzing weather data indicating an actual or forecast level of precipitation associated with the section of terrain.

76. The vehicle control system of example 61, wherein the sensor system an image capturing device, and wherein determining the level of moisture associated with the section of terrain includes performing an image recognition process on an image of the section of terrain captured by the image capturing device.

77. The vehicle control system of example 61, wherein the vehicle control system further comprises a steering control system adapted to drive and steer the vehicle along the determined path.

78. The vehicle control system of example 61, further comprising a display coupled to the processor, wherein determining the path for the vehicle includes displaying a two-dimensional representation of the three-dimensional map, and a visual representation of the path in conjunction with the three-dimensional map, on the display.

79. A tangible, non-transitory computer-readable medium storing instructions that, when executed by a vehicle control system, cause the vehicle control system to perform operations comprising:
determining a position of the vehicle based on the location data from a positioning system;
identifying a three-dimensional terrain map associated with the position of the vehicle;
determining a path for the vehicle based on the three-dimensional terrain map;
determining, based on data from a sensor system and the three-dimensional terrain map, a level of moisture associated with a section of terrain along the path of the vehicle; and
in response to determining the level of moisture associated with the section of terrain, performing one or more of: adjusting a feature of the vehicle prior to traversing the section of terrain, and modifying the path of the vehicle prior to traversing the section of terrain.

80. A method comprising:
determining a position of a vehicle based on location data from a positioning system;
identifying a three-dimensional terrain map associated with the position of the vehicle;
determining a path for the vehicle based on the three-dimensional terrain map;
determining, based on data from a sensor system and the three-dimensional terrain map, a level of moisture associated with a section of terrain along the path of the vehicle; and
in response to determining the level of moisture associated with the section of terrain, performing one or more of: adjusting a feature of the vehicle prior to traversing the section of terrain, and modifying the path of the vehicle prior to traversing the section of terrain.

Example 81 may include an apparatus comprising means to perform one or more elements of a method described in or related to any of examples 1-80, or any other method or process described herein.

Example 82 may include one or more non-transitory computer-readable media comprising instructions to cause an electronic device, upon execution of the instructions by one or more processors of the electronic device, to perform one or more elements of a method described in or related to any of examples 1-80, or any other method or process described herein.

Example 83 may include an apparatus comprising logic, modules, or circuitry to perform one or more elements of a method described in or related to any of examples 1-80, or any other method or process described herein.

Example 84 may include a method, technique, or process as described in or related to any of examples 1-80, or portions or parts thereof.

Example 85 may include an apparatus comprising: one or more processors and one or more computer-readable media comprising instructions that, when executed by the one or more processors, cause the one or more processors to perform the method, techniques, or process as described in or related to any of examples 1-80, or portions thereof.

Example 86 may include a vehicle control system, a vehicle implement control system, or a terrain mapping system adapted to perform a method, technique, or process as described in or related to any of examples 1-80, or portions or parts thereof.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in control system 100 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A terrain mapping system for a vehicle, the terrain mapping system comprising:
   a processor;
   one or more sensors on the vehicle, the one or more sensors coupled to the processor and arranged to collect three-dimensional terrain data;
   a digital camera on the vehicle, the digital camera coupled to the processor and arranged to capture terrain image data;
   a steering control system coupled to the processor; and
   memory coupled to the processor and storing instructions that, when executed by the processor, cause the terrain mapping system to perform operations comprising:
   determining two or more positions of the vehicle in a field at two or more times, respectively, based on location data from a positioning system associated with the vehicle;
   identifying a first three-dimensional terrain map associated with a first position of the two or more positions;
   determining a first path for the vehicle based on the first three-dimensional terrain map, and transmitting first control data based on the first path to the steering control system;
   identifying a second three-dimensional terrain map associated with a second position of the two or more positions and further based on information about terrain in front of the vehicle, captured by the one or more sensors and the digital camera, as the vehicle is driven and steered along the first path; wherein the second three-dimension map is based on data received from the one or more sensors, data received from the digital camera, and the location data from the positioning system, and includes at least:
   a ground surface topography for a section of terrain; and
   a topography of vegetation on the section of terrain;
   determining a second different path for the vehicle based on the ground surface topography of the section of terrain and the topography of the vegetation of the section of terrain, and transmitting second control data based on the second path to the steering control system; and
   generating a two-dimensional representation of the second path based on the second three-dimensional terrain map.

2. The terrain mapping system of claim 1, wherein the vehicle comprises a first vehicle, and wherein the first three-dimensional terrain map is based on data from one or more sensors on a second vehicle.

3. An apparatus including a tangible, non-transitory computer-readable medium storing instructions that, when executed by a terrain mapping system, cause the terrain mapping system to perform operations comprising:
   determining two or more positions of a vehicle in a section of terrain at two or more times, respectively, based on location data from a positioning system associated with the vehicle;
   identifying a first three-dimensional terrain map associated with a first position of the two or more positions;
   determining a first path for the vehicle based on the first three-dimensional terrain map;
   identifying a second three-dimensional terrain map associated with a second position of the two or more positions and further based on information about terrain in front of the vehicle, captured by one or more sensors on the vehicle and a digital camera on the vehicle, as the vehicle is driven and steering along the first path, wherein the second three-dimensional map is further based on data received from the positioning system, and includes at least:
   a ground surface topography for the section of terrain; and
   a topography of vegetation on the section of terrain;
   determining a second different path for the vehicle based on the ground surface topography of the section of terrain and the topography of the vegetation of the section of terrain; and generating a two-dimensional representation of the second path based on the second three-dimensional terrain map.

4. The apparatus of claim 3, wherein the second three-dimensional terrain map includes a plurality of objects within the section of terrain, and wherein the operations further comprise presenting a respective visual indicator on the two-dimensional representation for each respective object representing the object is traversable by the vehicle.

5. The apparatus of claim 3, further comprising:
a display screen coupled to the terrain mapping system, wherein the operations further comprise causing the terrain mapping system to display the two-dimensional representation on the display screen.

6. The apparatus of claim 3, wherein the operations further comprise transmitting an electronic communication comprising the two-dimensional representation to a vehicle control system.

7. The apparatus of claim 3, wherein the data received from the positioning system comprises global navigation satellite system (GNSS) data or local positioning system (LPS) data.

8. The apparatus of claim 3, wherein the data from the one or more sensors includes one or more of: radar sensor data, lidar sensor data, and imaging data.

9. The apparatus of claim 3, wherein the two-dimensional representation indicates a height of a portion of the vehicle above the ground surface.

10. The apparatus of claim 9, wherein the operations further comprise determining a depth of tracks made by the vehicle based on a change in the height of the portion of the vehicle above the ground surface.

11. The apparatus of claim 3, wherein the operations further comprise determining a height of a portion of the vegetation on the terrain above the ground surface.

12. The apparatus of claim 3, wherein the operations further comprise modifying a pre-existing feature of the first three-dimensional terrain map based on the ground surface topography for the section of terrain and the topography of vegetation on the section of terrain.

13. The apparatus of claim 3, wherein the two-dimensional representation indicates a level of moisture in the section of terrain.

14. The apparatus of claim 13, wherein identifying the level of moisture in the section of terrain includes identifying a first level of moisture in a first portion of the section of terrain, and identifying a second level of moisture in a second portion of the section of terrain, and wherein the first level of moisture is different from the second level of moisture.

15. The apparatus of claim 13, wherein identifying the level of moisture in the section of terrain includes identifying a body of water in the section of terrain.

16. The apparatus of claim 15, wherein identifying the level of moisture in the section of terrain includes determining whether the vehicle is capable of traversing the body of water.

17. The apparatus of claim 15, wherein identifying the level of moisture in the section of terrain includes determining a rate of flow of water through the body of water.

18. The apparatus of claim 15, wherein identifying the level of moisture in the section of terrain includes determining a depth of the body of water.

19. The apparatus of claim 15, wherein the two-dimensional representation indicates a path for the vehicle to circumvent the body of water.

20. A method comprising:
determining two or more positions of a vehicle in a section of terrain at two or more times, respectively, based on location data from a positioning system associated with the vehicle;
identifying a first three-dimensional terrain map associated with a first position of the two or more positions;
determining a first path for the vehicle based on the first three-dimensional terrain map; identifying a second three-dimensional terrain map associated with a second position of the two or more positions and further based on information about terrain in front of the vehicle, captured by one or more sensors on the vehicle and a digital camera on the vehicle, as the vehicle is driven and steering along the first path, wherein the second three-dimensional map is further based on data received from the positioning system, and includes at least:
a ground surface topography for a section of terrain; and
a topography of vegetation on the section of terrain;
determining a second different path for the vehicle based on the ground surface topography of the section of terrain and the topography of the vegetation of the section of terrain; and
displaying information about the second path on an electronic display.

* * * * *